(12) United States Patent
Dides et al.

(10) Patent No.: US 9,275,389 B1
(45) Date of Patent: Mar. 1, 2016

(54) MODULAR DEVICE PAYMENT SYSTEM

(71) Applicant: EBAY INC., San Jose, CA (US)

(72) Inventors: Emil Dides, San Jose, CA (US); Shereen Kamalie, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/555,144

(22) Filed: Nov. 26, 2014

(51) Int. Cl.
| | | |
|---|---|---|
| *G06K 5/00* | (2006.01) | |
| *G06F 7/08* | (2006.01) | |
| *G06K 19/06* | (2006.01) | |
| *G06Q 20/40* | (2012.01) | |
| *G06Q 20/36* | (2012.01) | |

(52) U.S. Cl.
CPC .............. *G06Q 20/405* (2013.01); *G06Q 20/36* (2013.01); *G06Q 20/40145* (2013.01)

(58) Field of Classification Search
CPC .............. G06Q 20/322; G06Q 20/353; G06Q 20/3226; G06Q 20/36; G06Q 20/405; G06Q 20/40145; H04M 1/0254
USPC .......................................... 235/380, 381, 492
See application file for complete search history.

(56) References Cited

U.S. PATENT DOCUMENTS

| | | | | |
|---|---|---|---|---|
| 2005/0236480 | A1* | 10/2005 | Vrotsos et al. ................ | 235/439 |
| 2009/0068982 | A1* | 3/2009 | Chen et al. .................... | 455/407 |
| 2012/0270528 | A1* | 10/2012 | Goodman ...................... | 455/418 |
| 2013/0095754 | A1* | 4/2013 | Moreton et al. ............. | 455/41.1 |
| 2014/0070774 | A1* | 3/2014 | Terlizzi et al. ................ | 320/162 |

* cited by examiner

*Primary Examiner* — Michael G Lee
*Assistant Examiner* — Laura Gudorf
(74) *Attorney, Agent, or Firm* — Haynes and Boone, LLP

(57) ABSTRACT

A modular device payment module includes a chassis. A modular device connector is located on the chassis. A payment module database in the chassis stores funding source information and security information. A payment module engine in the chassis determines that the modular device connector has been connected to a modular device frame of a modular device, and retrieves modular device identifying information from the modular device. The payment module then determines that the modular device identifying information matches an authorized modular device identified by the security information in the payment module database and, in response, enables the transmission of at least some of the funding source information from the payment module database to conduct a payment transaction.

20 Claims, 19 Drawing Sheets

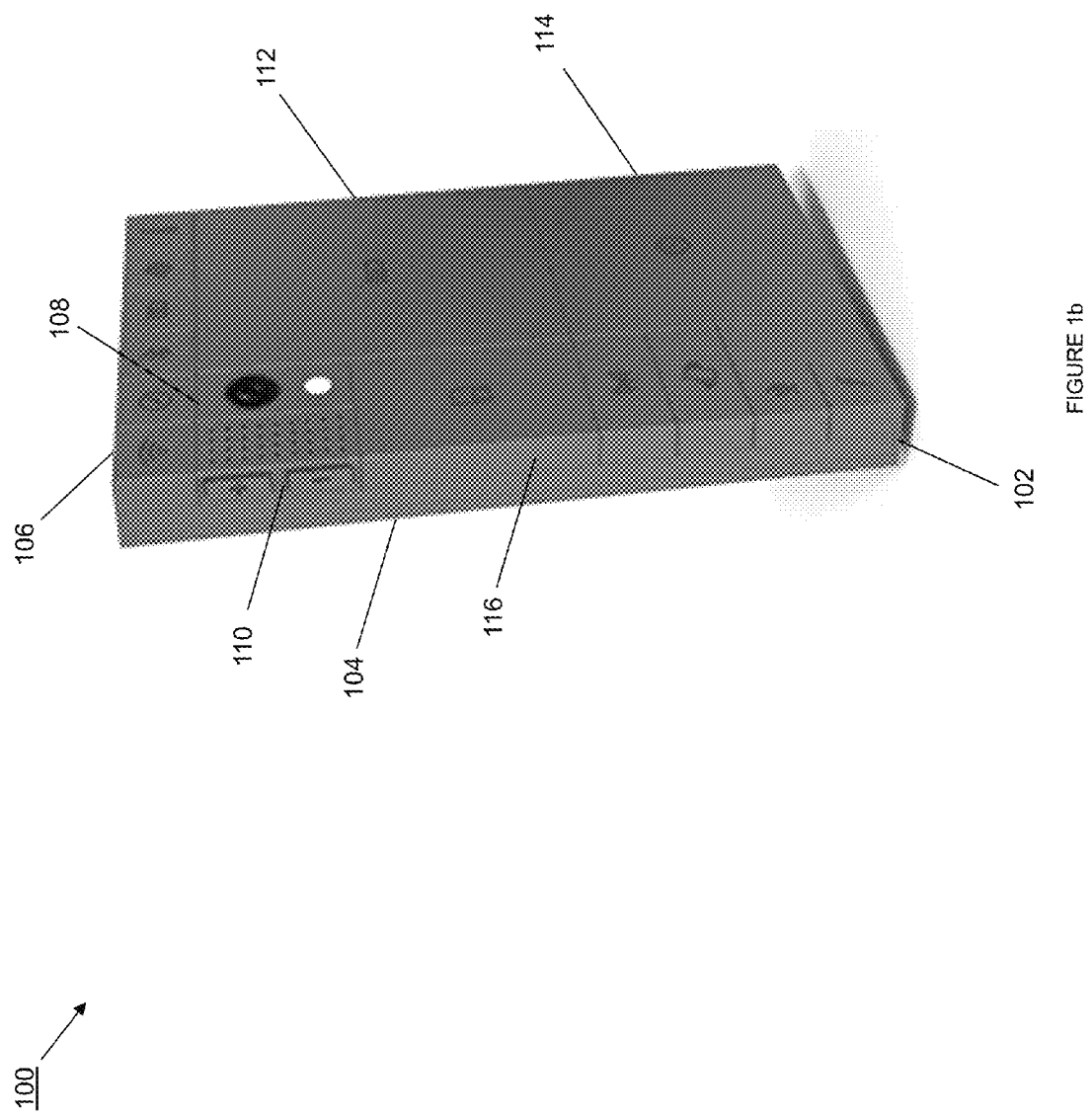

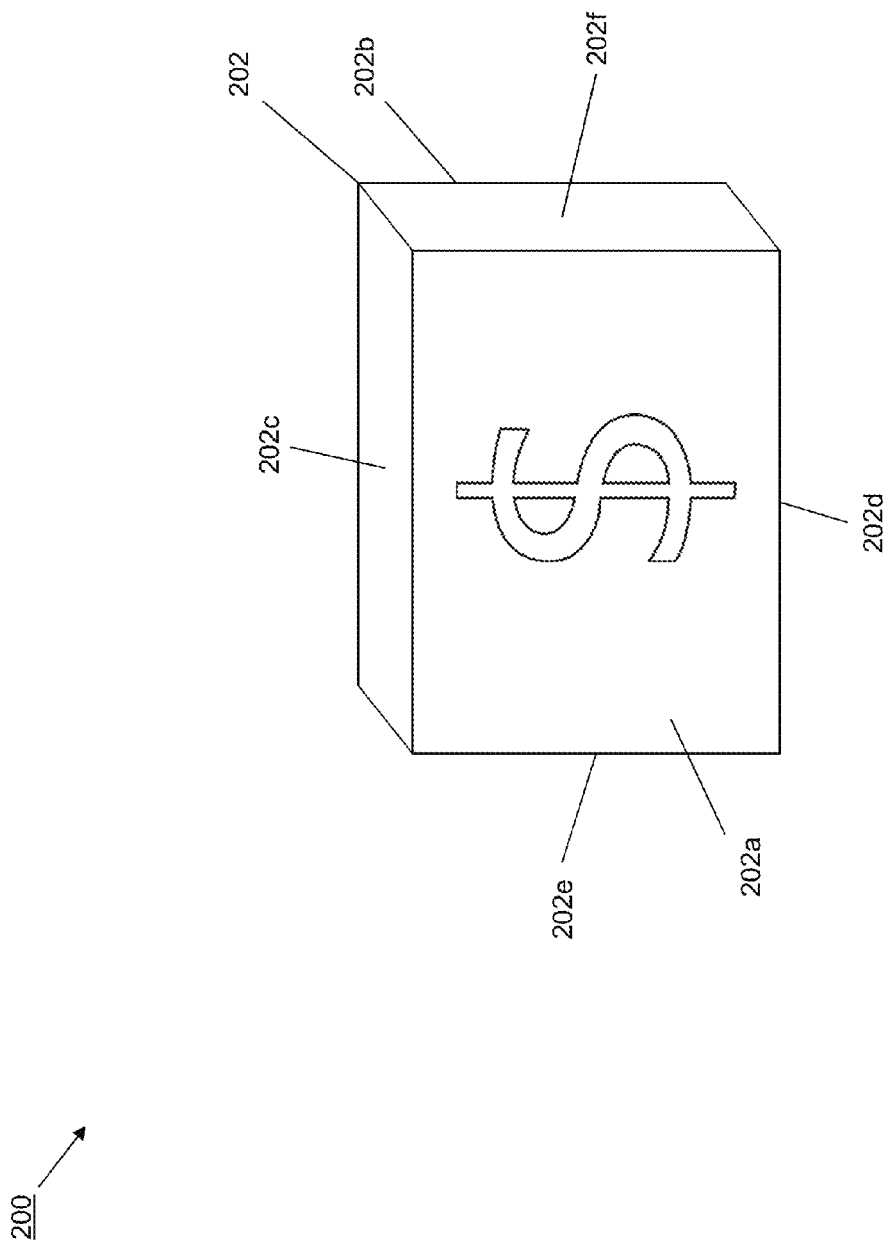

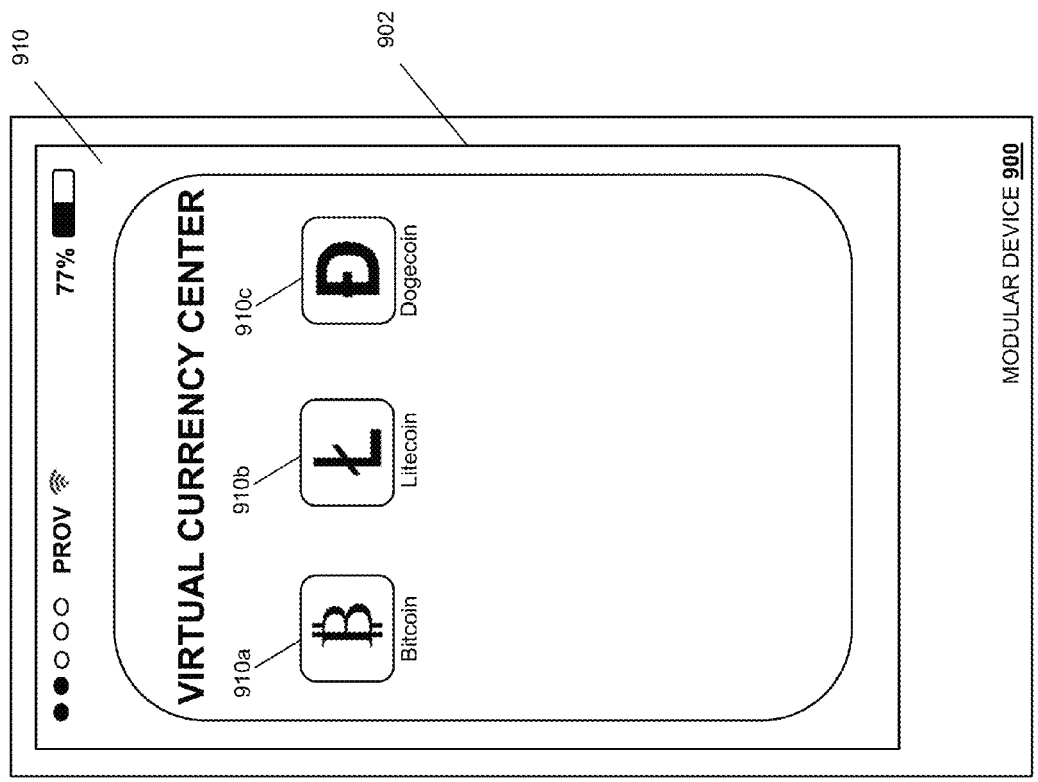

US 9,275,389 B1

MODULAR DEVICE PAYMENT SYSTEM

BACKGROUND

1. Field of the Disclosure

The present disclosure generally relates to online and/or mobile payments and more particularly to a modular device payment system.

2. Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

The use of phones and other user devices for making online and/or mobile payments is growing rapidly, as traditional payment devices such as cash and credit cards are being replaced by wireless payment systems that allow the user to use their phone or other user device to transmit payment information to a merchant device of a merchant in order to complete a purchase.

Traditionally, phones have been provided by manufacturers to users as an integrated device that must be entirely replaced when one or more components fail or become obsolete. However, recently the concept of a modular phone has been proposed, which provides a modular phone frame to which different modular components of the phone may be attached (e.g., a screen module, a battery module, a storage module, a camera module, a speaker module, etc.) The use of modular components, along with the provision of a modular component ecosystem that allows for phone manufacturers and third party suppliers to provide users with modular components, allows a user to replace modular components rather than the entire phone when one of the modular components on the phone fails or becomes obsolete.

The concept of the modular phone provides for several advantages in online and/or mobile payments via phones and/or other user devices that are described in detail below.

BRIEF DESCRIPTION OF THE FIGURES

FIG. 1b is a rear perspective view illustrating an embodiment of the modular device of FIG. 1a with each of the modules connected to the modular device frame of the modular device;

FIG. 2a is a front perspective view illustrating an embodiment of a payment module used with the modular device of FIGS. 1a, 1b, and 1c;

FIG. 2b is a rear perspective view illustrating an embodiment of the payment module of FIG. 2a;

FIG. 9c is a screen shot illustrating a virtual currency center wallet management application displaying a plurality of virtual currency wallet application icons;

Figure 1A:
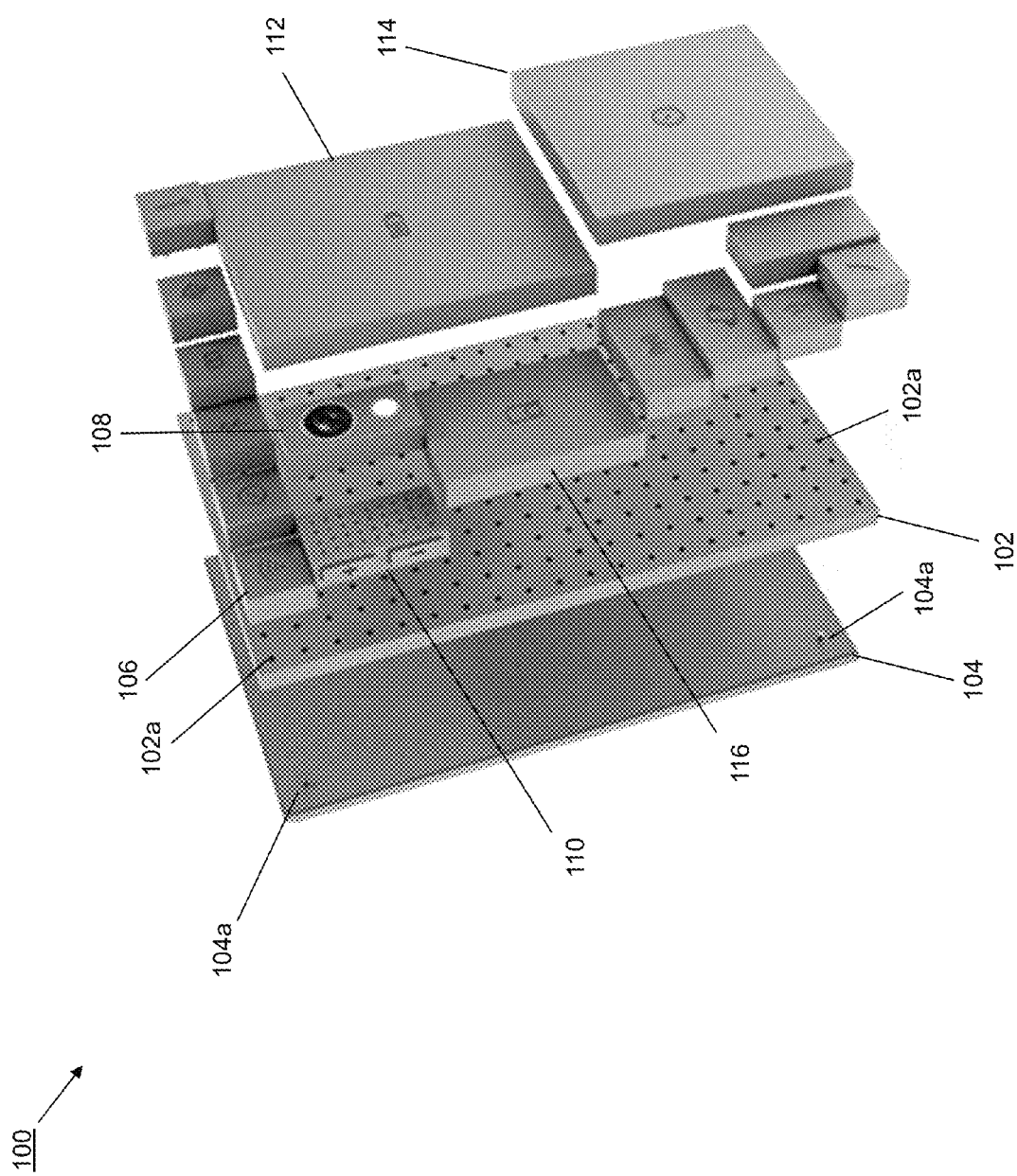
FIG. 1a is a exploded rear perspective view illustrating an embodiment of a modular device.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides modular device payment systems and methods for making payments using modular device payment modules that are configured to connect to a modular device frame of a modular device such as, for example, a modular phone. The payment module may provide a self-contained payment device that stores information about one or more funding sources, that may include one or more communication systems, and that provides a payment module engine that is configured to conduct payment transactions using the funding source information and the communication system(s). The payment module may store security information that ensures that the payment module cannot be used with unauthorized modular devices, and upon connection to a module device frame, the payment module may retrieve modular device identifying information from that modular device, determine whether it matches an authorized modular device identified by the security information and, if so, enable the transmission of the funding source information for conducting a payment transaction. If the modular device identifying information retrieved from the modular device does not match an authorized modular device identified by the security information, the payment module may take steps such as disabling the transmission of the funding source information, locking the payment module, and even erasing the funding source information and/or other information from the payment module. In addition, the payment module may include additional integrated or attachable features such as, for example, a biometric input device, a card reader, a card information provisioning member, and/or other payment and security features. In specific embodiments, the payment module may provide a highly secure, multiple virtual currency wallet management system that utilizes a virtual machine and physical or virtual cards that each store a respective virtual currency wallet and that operate to present multiple layers of authentication to protect virtual currencies that are accessible on the payment module.

Figure 1C:
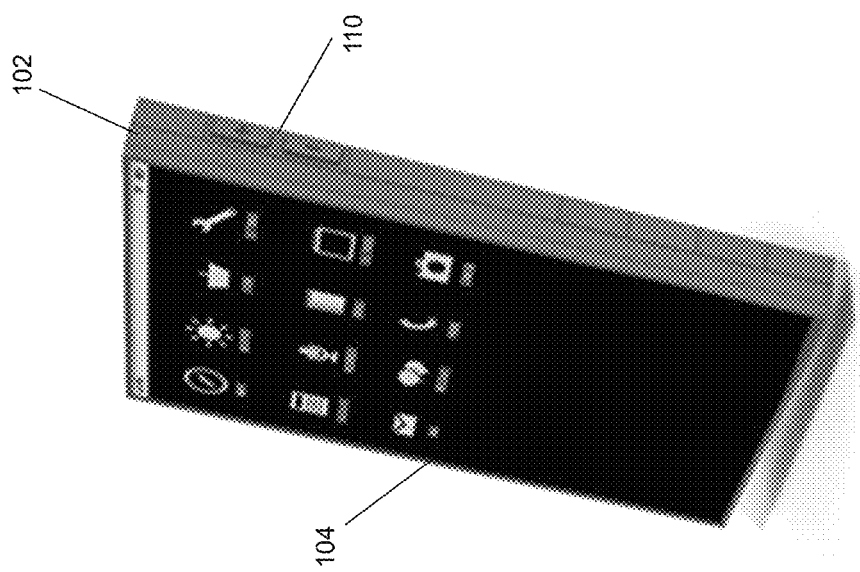
FIG. 1c is a front perspective view illustrating an embodiment of the modular device of FIG. 1b.

Referring now to FIGS. 1a, 1b, and 1c, an example of a modular device 100 is provided that, in the illustrated embodiment, is a modular phone. However, as discussed below, the modular device/modular phone may be a variety of other modular devices known in the art. Furthermore, in some embodiments, the functionality discussed below with regard to the modular device may be provided in an integrated or non-modular user device while remaining within the scope of the present disclosure. The modular device 100 includes a modular device frame 102 having a plurality of module connectors 102a (both on a first side illustrated in FIG. 1a, as well as a second side that is not illustrated but that is located opposite the modular device frame 102 from the first side). While not illustrated, one of skill in the art in possession of the present disclosure will recognize that the modular device frame 102 houses a plurality of electrical connections, busses, and/or other links between the module connectors 102a to allow modules connected to the modular device frame 102 to communicate with each other, as discussed further below. The modular device 100 also includes a plurality of modules that, in the illustrated embodiment, include a display module 104 that includes modular device connectors 104a that are configured to engage the module connectors 102a on the modular device frame 102, a Wi-Fi communication module 106 (which includes modular device connectors, not illustrated, that are configured to engage the module connectors 102a on the modular device frame 102), a camera module 108 (which includes modular device connectors, not illustrated, that are configured to engage the module connectors 102a on the modular device frame 102), a speaker module 110 (which includes modular device connectors, not illustrated, that are configured to engage the module connectors 102a on the modular device frame 102), a battery module 112 (which includes modular device connectors, not illustrated, that are configured to engage the module connectors 102a on the modular device frame 102), a processing module 114 (which includes modular device connectors, not illustrated, that are configured to engage the module connectors 102a on the modular device frame 102), a security module 116 (which includes modular device connectors, not illustrated, that are configured to engage the module connectors 102a on the modular device frame 102), and/or other modules that are not referenced by reference numbers in FIGS. 1a, 1b, or 1c but which may include memory modules, other communication modules, any of a variety of computing components known in the art, and the payment module discussed below.

As illustrated in FIGS. 1a, 1b, and 1c, each of the modules may be connected to the modular device frame 102 to provide the modular device 100, and as discussed above, users may replace failed modules, add different modules, and upgrade modules depending on the user's desired functionality of the modular device 100. For example, if a storage module is running out of space, the user may upgrade the current storage module with a higher capacity storage module and connect it to the modular device frame 102. Furthermore, as discussed below, a payment module may be provided that connects to the modular device frame 102 and that may be configured to conduct payment transactions, either by itself (e.g., without the need to communicate with other modules connected to the modular device frame 102) or with the assistance of and/or utilizing communication with other modules connected to the modular device frame 102. While a specific modular device 100 has been illustrated and described, one of skill in the art in possession of the present disclosure will recognize that a wide variety of different types of modular devices having different form factors, different modular device frames, different module connection methods, and/or other different modular device characteristics will benefit from the teachings of the present disclosure and thus will fall within its scope.

Figure 2B:
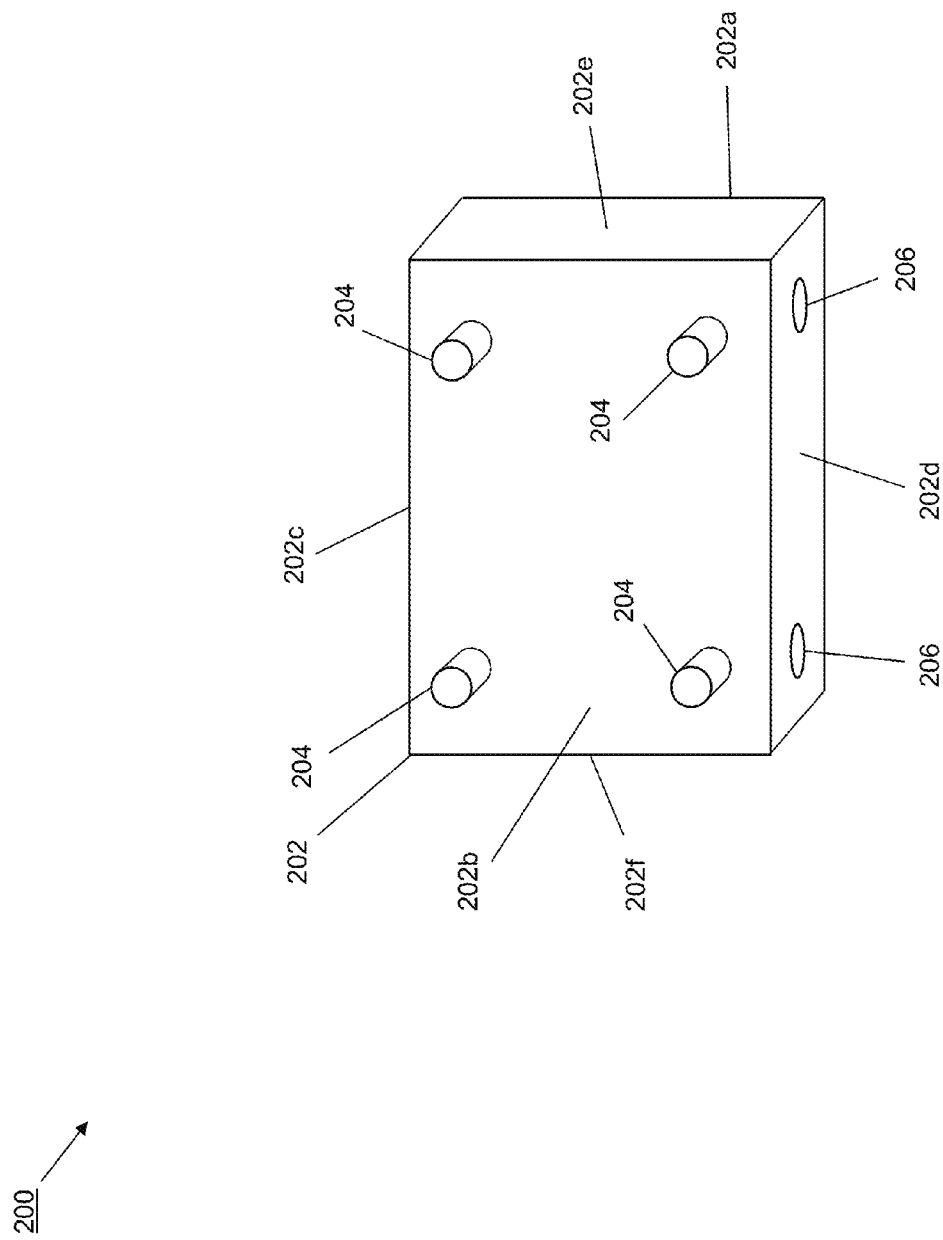

Referring now to FIGS. 2a and 2b, an embodiment of a payment module 200 is illustrated. The payment module 200 includes a chassis 202 having a front surface 202a, a rear surface 202b located opposite the chassis 200 from the front surface 202a, a top surface 202c extending between the front surface 202a and the rear surface 202b, a bottom surface 202d extending between the front surface 202a and the rear surface 202b and located opposite the chassis 200 from the top surface 202c, and a pair of opposing side surfaces 202e and 202f extending between the front surface 202a, the rear surface 202b, the top surface 202c, and the bottom surface 202d and located opposite the chassis 200 from each other. A plurality of modular device connectors 204 extend from the rear surface 202b and are coupled to components housed in and/or provided by the payment module 200, discussed in further detail below. In the illustrated embodiment, a plurality of sub-module connections 206 are included on the payment module 202 and are coupled to components housed in and/or provided by the payment module 200. As discussed below, in some embodiments sub-modules may be coupled to the payment module 200 through the sub-module connections 206, while in other embodiments, the sub-module functionality discussed below may be integrated as part of the payment module 200.

Figure 3:
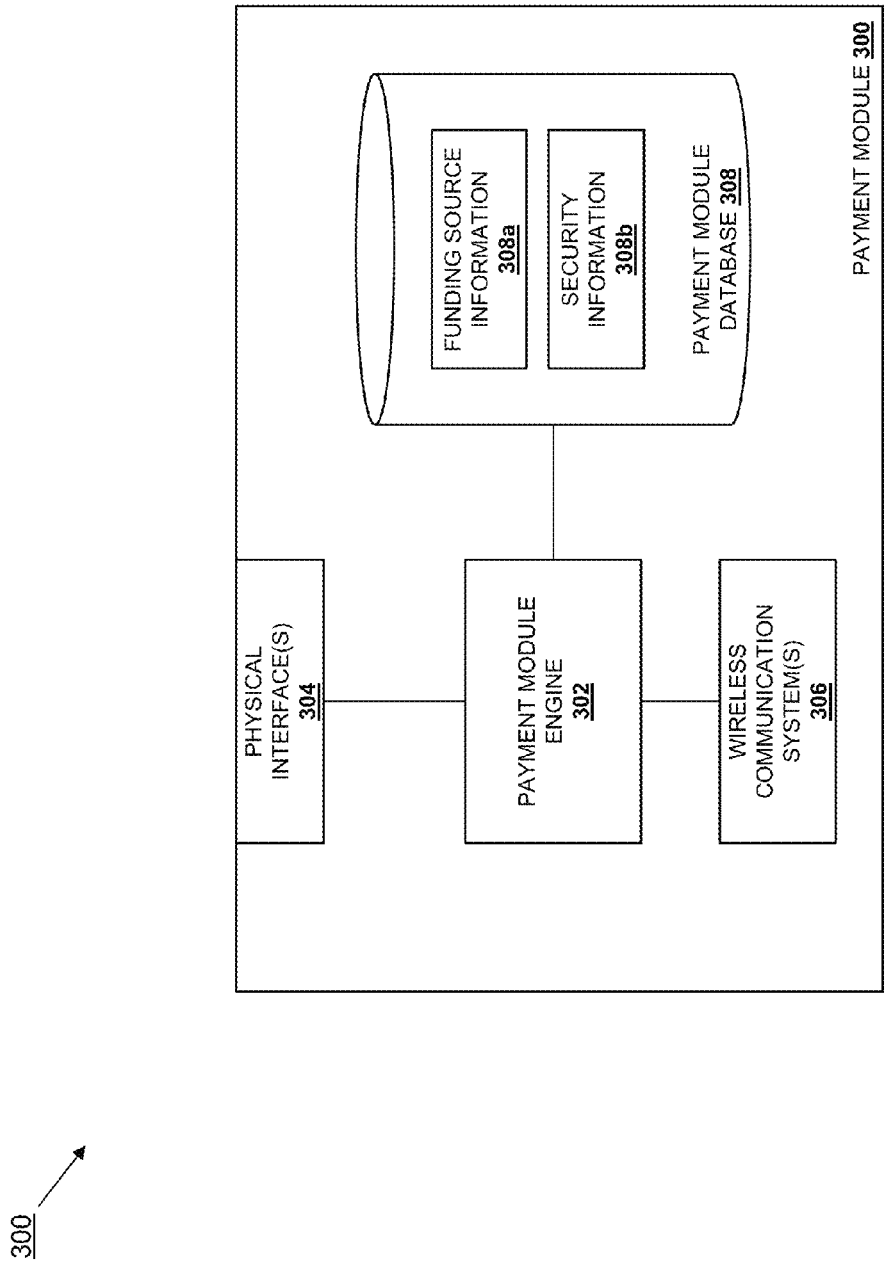
FIG. 3 is a schematic view illustrating an embodiment of a payment module that may be the payment module illustrated in FIGS. 2a and 2b.

Referring now to FIG. 3, an embodiment of a payment module 300 is illustrated that may be the payment module 200 discussed above with reference to FIGS. 2a and 2b. As such, the components included in and/or provided by the payment module 300 discussed below may be housed in the chassis 202 of the payment module 200. The payment module 300 may include a hardware processing system (not illustrated) and a non-transitory, computer-readable medium or memory system that includes instructions that, when executed by the hardware processing system, cause the hardware processing system to configure a payment module engine 302 that performs the functionality of the payment module engines and payment modules taught herein. The payment module 300 may also include one or more physical interfaces 304 (e.g., the modular device connectors 204 and/or the sub-module connections 206) that are coupled to the payment module engine 302 through, for example, a bus or other connection between the hardware processing system and the one or more physical interfaces 304. The payment module 300 may also include one or more wireless communication systems 306 such as, for example, a Wi-Fi communication system, a Bluetooth communication system or Bluetooth Low Energy (BLE) communication system, a Near Field Communication (NFC) system, a beacon communication system, and/or a variety of other wireless communications systems known in the art that are coupled to the payment module engine 302 through, for example, a bus or other connection between the hardware processing system and the wireless communication system 306. The payment module 300 also includes a payment module database 308 that stores funding source information 308a and security information 308b, discussed in further detail below, and that is coupled to the payment module engine 302 through, for example, a bus or other connection between the hardware processing system and a storage system that provides the payment module database 308.

While each of the components of the payment module 300 are illustrated as included in the payment module 300, in some embodiments at least some of the components of payment module 300 may be coupled to the payment module engine 302 through the one or more physical interfaces 304 and the modular device frame 102. For example, in some embodiments, the wireless communication system 306 may be included in the Wi-Fi communication module 106 and coupled to the payment module engine 302 through the one or more physical interfaces 304 and the modular device frame 102. As such, one of skill in the art in possession of the present disclosure will recognize that other components utilized by the payment module engine 302 as discussed below may be similarly provided as modules included on the modular device 100.

In some embodiments, the payment module 300 may be utilized in conjunction with a payment service provider such as, for example, PayPal Inc. of San Jose, Calif. For example, a payment service provider may utilize a payment service provider device to provide payment services to a user of the payment module. As in known in the art of payment services, one or more account providers utilizing account provider devices may provide funding source accounts such as checking accounts, savings accounts, credit accounts, and/or other payment accounts to the user. The user may then provide funding source information associated with those accounts provided by the account providers to the payment service provider (via the payment service provider device), and then use a payment service provider account to make payments that may be drawn from one or more of those funding sources. In addition, the payment service provider may provide payment accounts to the user as well for making payments.

In some embodiments, the funding source information 308a stored in the payment module database 308 may be provided by a user and may include any funding sources associated with a user and provided by the account providers and/or payment service providers discussed above. For example, a user may connect the payment module 300 to the modular device frame 102 of the modular device 100, provide a username and password (or other authentication information that may be verified by the payment module using the security information 308b in the payment module database 308) to authorize the payment module 300 to conduct payment transactions when connected to the modular device 100, and provide information about checking account funding sources (e.g., checking account numbers, etc.), savings account funding sources (e.g., savings account numbers, etc.), credit account funding sources (e.g., credit account numbers, expiration dates, security codes, etc.), and/or a variety of funding sources known in the art for authentication and storage in the payment module database 308. As such, when provisioned with funding source information, the payment module 300 may be considered an "electronic wallet" that stores information about any funding source that the user may wish to use with a merchant. Furthermore, the user may add and/or remove funding sources as desired to the payment module.

However, in some embodiments, the payment module 300 may be funding source specific such that it is only associated with a single funding source. For example, a credit account provider may provide the user with a credit account payment module that includes only funding source information associated with their credit account (e.g., a credit account number, expiration date, security code, etc.), and the user may provide authentication information substantially as described above to authorize that credit account payment module for use in conducting payment transactions when connected to the modular device frame 102 of the modular device 100. Similarly, the payment module may be solely a virtual currency wallet manager as discussed below. As such, the user may possess multiple funding-source-specific payment modules that may be connected to the modular device frame 102 depending on which funding source the user would like to use to conduct a payment transaction.

Figure 4:
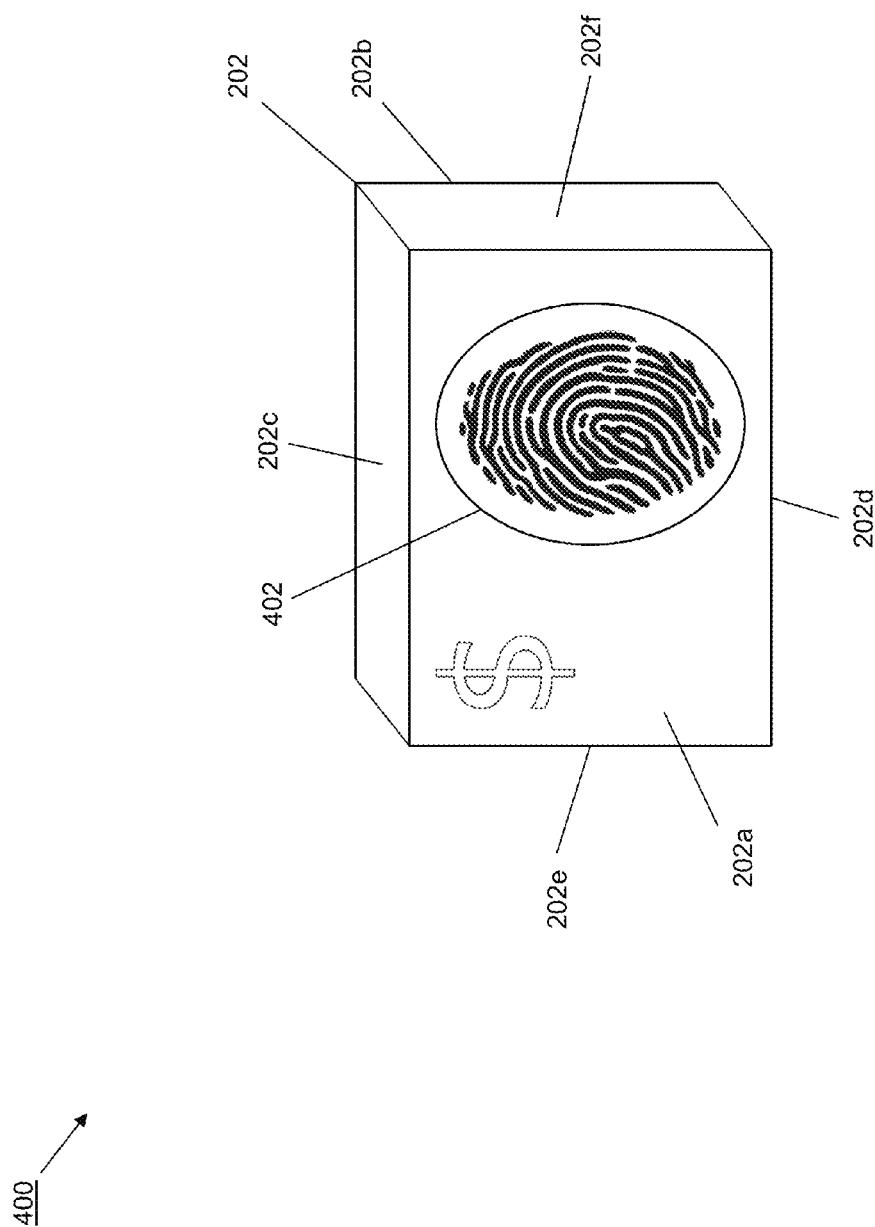
FIG. 4 is a front perspective view illustrating an embodiment of a payment module including a biometric input device.

Referring now FIG. 4, an embodiment of a payment module 400 is illustrated that is substantially similar to the payment modules 200 and/or 300 discussed above with reference to FIGS. 2a, 2b, and 3, but with the provision of a biometric input system 402. The biometric input system 402 may be housed in and/or located on the chassis 202, and coupled to the payment module engine 302 through a bus or other connection between the hardware processing system and the biometric input system 402. In the illustrated embodiment, the biometric input system 402 is a thumbprint or fingerprint reader, but in other embodiments may include eye scanners, a facial capture and recognition system, and/or a variety of other biometric input systems known in the art. The payment module 400 illustrated in FIG. 4 provides an example of the payment module 200 with an integrated sub-module (i.e., a biometric input system sub-module), but in other embodiments the biometric input system sub-module may be coupled to the payment module 200 via the sub-module connectors 206. As discussed below, the biometric input system 402 allows for the user to authenticate with the payment module 400 to conduct payment transactions. As such, the user may register a biometric input with the payment module upon initial connection to a modular device by providing authentication information and then allowing the biometric input system 402 to receive and store a biometric input as part of the security information 308b in the payment module database 308.

Figure 5:
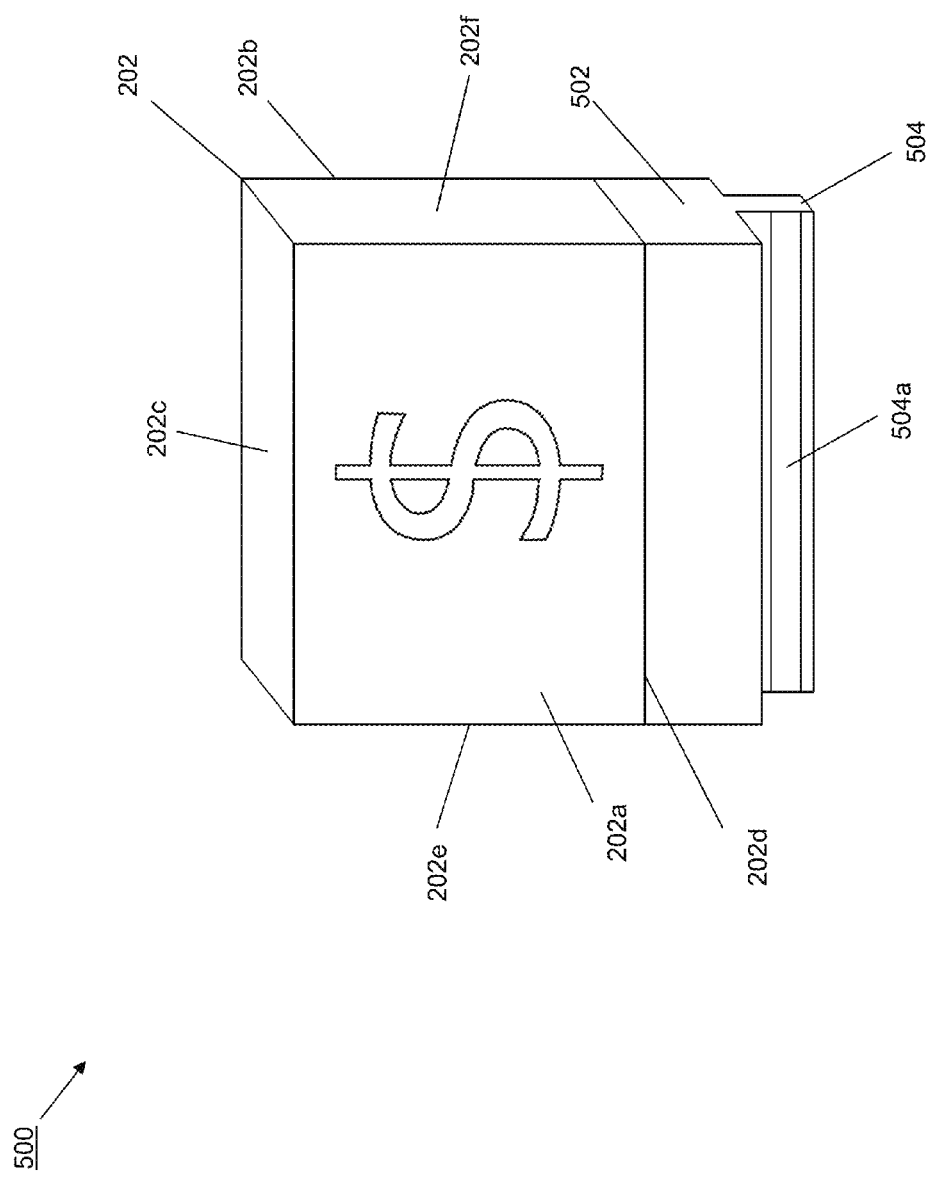
FIG. 5 is a front perspective view illustrating an embodiment of a payment module including a card information provisioning member.

Referring now FIG. 5, an embodiment of a payment module 500 is illustrated that is substantially similar to the payment modules 200 and/or 300 discussed above with reference to FIGS. 2a, 2b, and 3, but with the provision of a card sub-module 502 that includes a card information provisioning member 504 that extends from the card sub-module 502 and that includes an information transfer element 504a. In the illustrated embodiment, the card sub-module 502 is a separate sub-module that includes sub-module connectors (not illustrated) that engage the sub-module connections 206 on the payment module 200 to couple the card sub-module 502 to the payment module engine 302 through a bus or other connection between the hardware processing system and the sub-module connections 206, but in other embodiments the card sub-module 502 may be integrated with the payment module 500. The card sub-module 502 provides the card information provisioning member 504 with the information transfer element 504a configured to transfer funding source information to a card reader device. In some embodiments, the information transfer element 504a may be a conventional magnetic stripe information transfer element that is configured to provide card information to a card reader device. In other embodiments, the payment module engine 302 may be configured to dynamically program, push, or otherwise provide card information to the information transfer element 504a such that that card information may be transferred from the information transfer element 504a to a card reader when the card information provisioning member 504 is moved through the card reader (i.e., the user may select from different funding source information 308a in the payment module database 308 to have card information associated with a selected funding source be provided to the information transfer element 504a to, for example, provide a particular credit card number for a selected credit card account to the card reader using the card information provision member 504). The payment module 500 illustrated in FIG. 5 provides an example of a sub-module coupled to the payment module 200 via the sub-module connectors 206. However, as discussed above, the functionality of the card sub-module 502 may be integrated (i.e., without the ability to attached and detach the card sub-module 502 from the payment module chassis 202) with the payment module 200 while remaining within the scope of the present disclosure.

Figure 6:
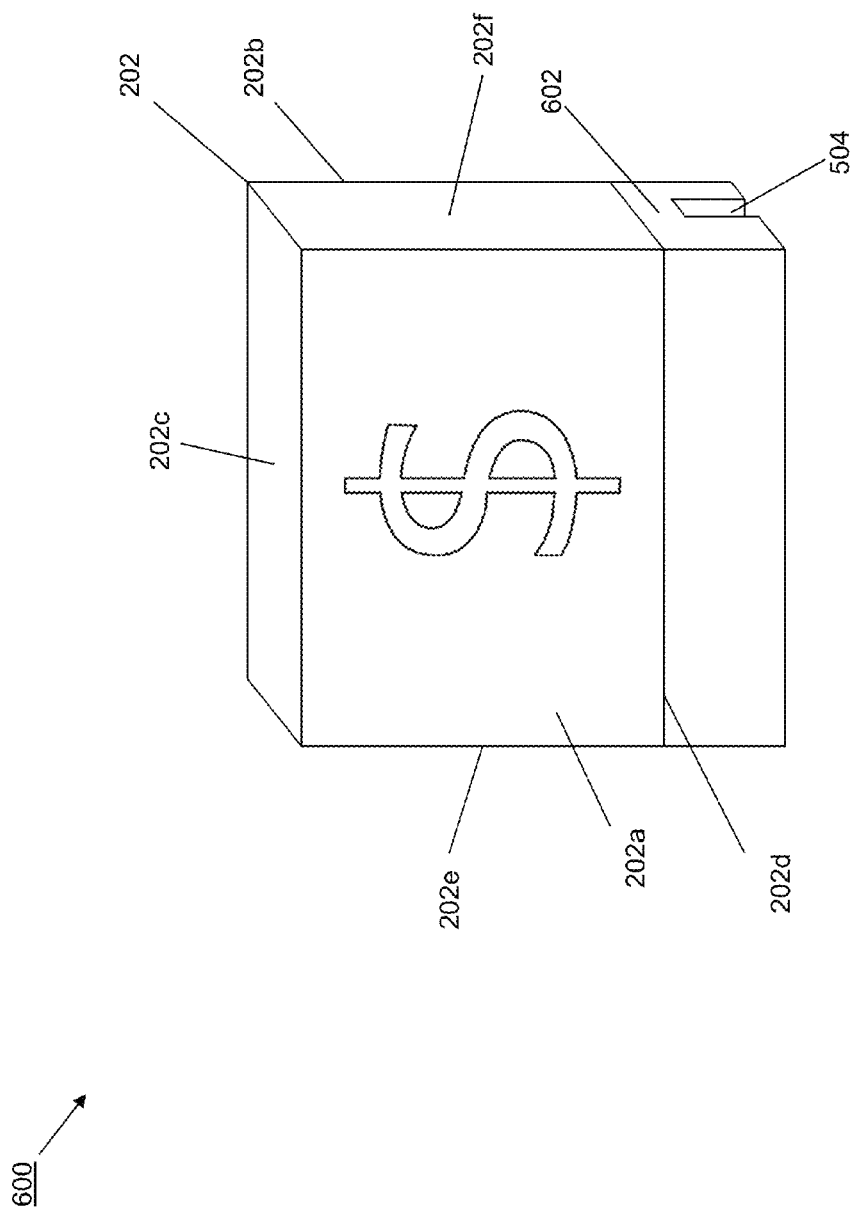
FIG. 6 is a front perspective view illustrating an embodiment of a payment module including a card reader device.

Referring now FIG. 6, an embodiment of a payment module 600 is illustrated that is substantially similar to the payment modules 200 and/or 300 discussed above with reference to FIGS. 2a, 2b, and 3, but with the provision of a card reader sub-module 602 that includes a card reader channel 604 that is defined by the card reader sub-module 602 and that includes an card reader element (not illustrated, but located in the card reader channel 604 as would be understood by one of skill in the art). In the illustrated embodiment, the card reader sub-module 602 is a separate sub-module that includes sub-module connectors (not illustrated) that engage the sub-module connections 206 on the payment module 200 to couple the card reader sub-module 602 to the payment module engine 302 through a bus or other connection between the hardware processing system and the sub-module connections 206, but in other embodiments the card reader sub-module 602 may be integrated with the payment module 500. In the illustrated embodiment, the payment module engine 302 is configured to receive card information from a card when a magnetic stripe or other information transfer element is moved through the card reader channel 604 and past the card reader element. As such, the payment module 600 may be utilized by a merchant for accepting payments in a payment transaction, rather than a customer providing payment in a payment transaction.

Figure 7:
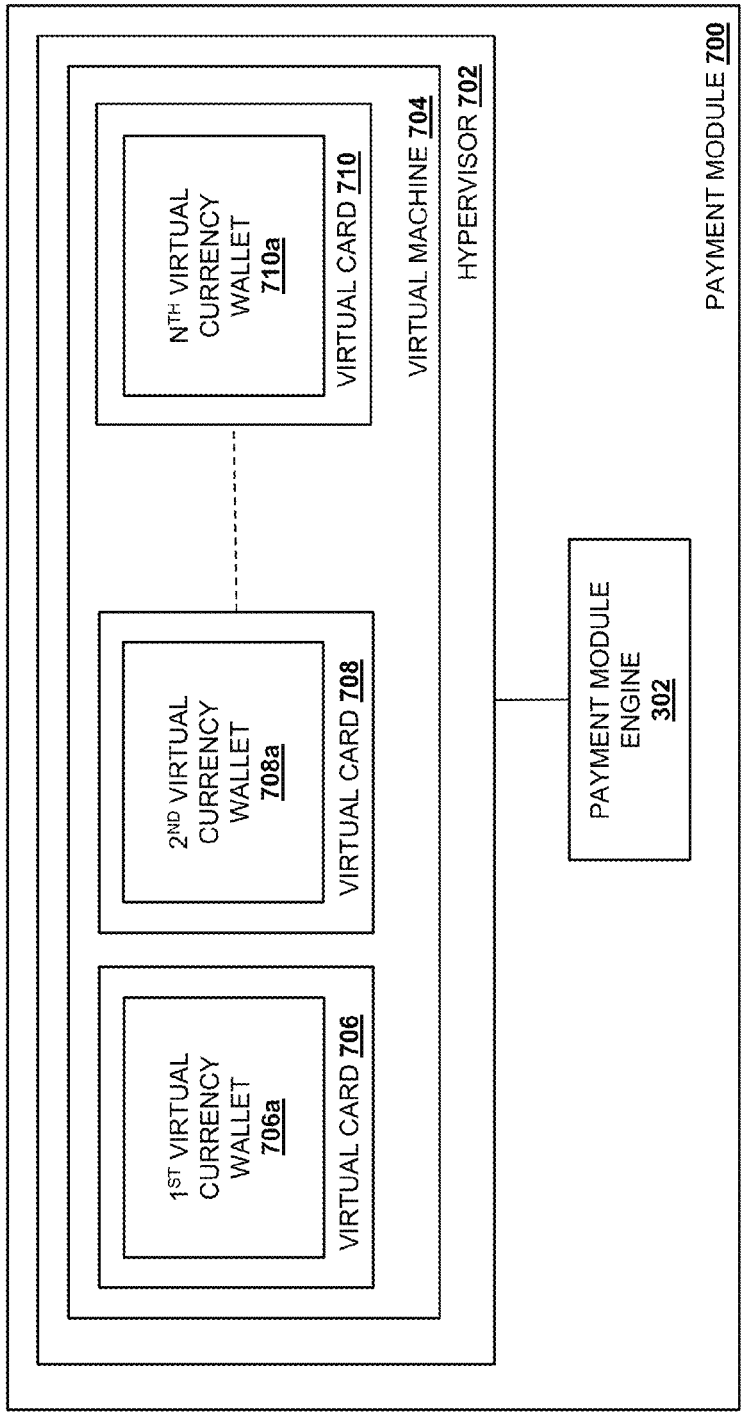
FIG. 7 is a schematic view illustrating an embodiment of a payment module including a plurality of virtual currency wallets.

Referring now to FIG. 7, an embodiment of a payment module 700 is illustrated that is substantially similar to the payment modules 200 and/or 300 discussed above with reference to FIGS. 2a, 2b, and 3, but with the provision of a highly secure, multiple virtual currency wallet management system. The payment module 700 includes the payment module engine 302 that is coupled to a hypervisor 702 that may be provided by instructions on the non-transitory memory system that, when executed by the hardware processing system, cause the hardware processing system to perform the functionality of the hypervisor 702 and its subcomponents discussed below. One of those subcomponents includes a virtual machine 704 that is configured to be communicatively coupled to, or to otherwise access, a plurality of cards discussed below that may include, for example, secure digital (SD) cards and/or other storage cards known in the art. In an embodiment, the virtual machine 704 may be provided by a hardware processing system that is provided in the payment module 700 and that is dedicated to providing the virtual machine 704 (e.g., that is separate from the hardware processing system that provides the payment module engine 302), or may be provided by a virtualized processing module that is dedicated to providing the virtual machine 704. In the illustrated embodiment, the cards are virtual cards 706, 708, and up to 710, but in some embodiments the cards 706, 708, and 710 may be physical cards that are coupled to the payment module 700.

Each of the virtual cards includes a different virtual currency wallet by, for example, including a virtual currency wallet application that stores one or more private keys that provide the ability to transfer virtual currency associated with one or more public addresses, as is known in the art of virtual currency. For example, each virtual card may include a True-Crypt (or similar) linked folder that stores the virtual currency wallet application on that virtual card. As such, virtual card 706 includes a first virtual currency wallet 706a, virtual card 708 includes a second virtual currency wallet 708a, and virtual card 710 includes an Nth virtual currency wallet 710a. In some embodiments, each of the virtual currency wallets 706a, 708a, and 710a may be associated with different types of virtual currency (e.g., virtual currency wallet 706a may provide access to Bitcoin, virtual currency wallet 708a may provide access to Litecoin, virtual currency wallet 710a may provide access to Dogecoin, etc.). In other embodiments, at least some of the virtual currency wallets 706a, 708a, and 710a may be associated with the same type of virtual currency (e.g., the first virtual currency wallet 706a may store one or more first private keys that provide the ability to transfer virtual currency (e.g., Bitcoin) associated with one or more first public addresses, and the second virtual currency wallet 708a may store one or more second private keys that provide the ability to transfer the same type of virtual currency (e.g., Bitcoin) associated with one or more second public addresses that are different from the one or more first public addresses).

The highly secure, multiple virtual currency wallet manager provided by the payment module 700 provides the ability to manage and store multiple virtual currency wallets of the same and/or different types of virtual currency, while presenting three security layers to a user attempting to access a virtual currency wallet to transfer virtual currency to another user. As discussed in further detail below, a user wishing to access any of the first virtual currency wallet 706a, the second virtual currency wallet 708a, or the Nth virtual currency wallet 710a must provide a first authentication to the virtual machine 704, then must provide a second authentication to the virtual card that stores the virtual currency wallet the user wishes to access, and must then provide a third authentication to the virtual currency wallet the user wishes to access. In addition, the virtual or physical cards may be cloned, backed up, or otherwise copied to a separate storage system (e.g., a physical storage device, the cloud, etc.) to ensure that failure, theft, loss, or other unavailability of the payment module does not threaten access to the virtual currency on any of those virtual cards.

Figure 8:
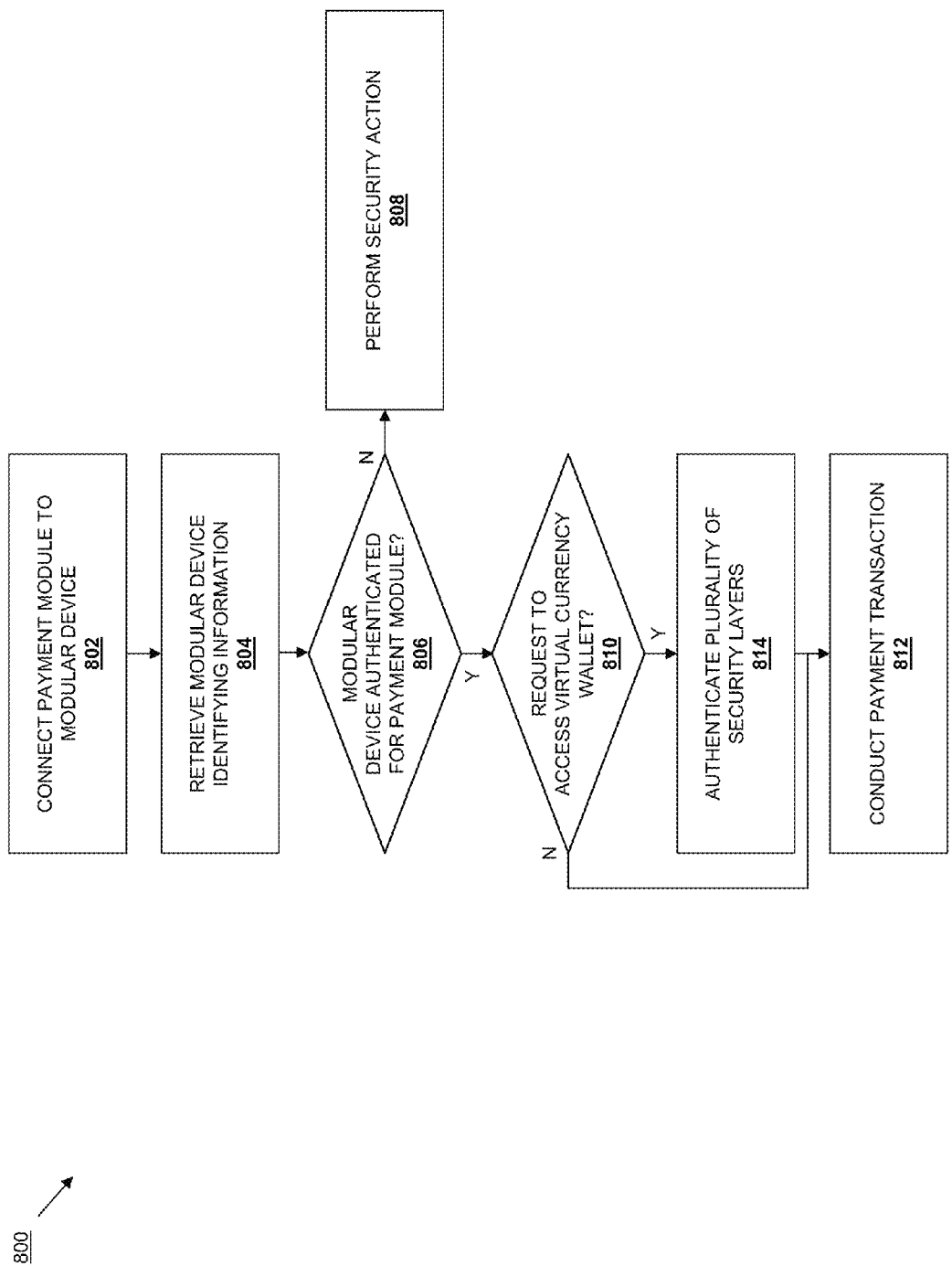
FIG. 8 is a flow chart illustrating an embodiment of a method for making payments.

Referring now to FIG. 8, an embodiment of a method 800 for conducting a payment transaction with a modular device payment module is illustrated. The method 800 begins at block 802 where the payment module is connected to the modular device. As discussed above, the payment module 200 may be connected to the modular device frame 102 of the modular device 100 by positioning the modular device connectors 204 on the payment module 200 adjacent the module connections 102a on the modular device frame 102 and moving the payment module 200 towards the modular device frame 102 to engage the modular device connectors 204 and the module connections 102a. Engagement of the modular device connectors 204 and the module connections 102a physically couples the payment module 200 to the modular device frame 102 and permits communication by the payment module engine 302 with the modular device frame 102 and other modules that are connected to the modular device frame 102.

The method 800 then proceeds to block 804 where modular device identifying information is retrieved. Prior to the method 800, the user may have defined, identified, or otherwise provided information about one or more authorized modular devices as part of the security information 308b in the payment module database 308. In an embodiment, a device identifier, phone number, unique code, user information, identifying information that includes identifiers that are associated with each of the modules that are connected to the modular device frame 102, and/or other information that uniquely identifies a modular device of the user may be provided to the payment module 200 for storage in the payment module database 308 as part of the security information 308b. For example, upon connecting the payment module 200 to a modular device frame as discussed above, and determining that the modular device is not authorized, discussed below, the payment module 200 may provide the user with the ability to authorize that modular device for the payment module 200 by requesting user authorization credentials (e.g., a user identifier and passcode, a biometric identifier, etc.). If those user authorization credentials are verified with credentials included in the security information 308b, the payment module 200 may then retrieve the identifying information from the modular device and associate it with an authorized modular device in the security information 308b. In addition, additional security may be provided for the payment module by sending authorized modular device information to a provider of the payment module (e.g., a payment service provider) and having the authorized modular device information stored in the security information 308b prior to providing the payment module to the user.

In an embodiment, the payment module engine 302 operates at block 804 to communicate with at least one of a component in the modular device frame 102 and/or another module that is connected to the modular device frame 102 to retrieve identifying information from the modular device 100. For example, identifying information about the modular device may be stored in the modular device frame 102 (e.g., in a storage device included in the modular device frame 102), in the security module 116 coupled to the modular device frame 102, and/or in other modules that are coupled to the modular device frame 102. The identifying information retrieved by the payment module engine 302 may include the device identifier, phone number, unique code, user information, and/or other information that was used to uniquely identify the modular device 100. In some examples, the identifying information may include identifiers that are associated with each of the modules that are connected to the modular device frame 102.

The method 800 then proceeds to decision block 806 where it is determined whether the modular device is authenticated for the payment module. In an embodiment, the payment module engine 302 compares the identifying information retrieved from the modular device 100 at block 804 with the security information 308b in the payment module database 308 to determine whether the identifying information matches an authorized modular device identified by the security information 308b. As such, the payment module engine 302 may determine at decision block 806 that the device identifier, phone number, unique code, user information or other information that uniquely identifies the modular device 100 matches device identifiers, phone numbers, unique codes, user information or other information that uniquely one or more modular devices in the security information 308b of the payment module database 308. In a specific embodiment, the security information 308b may include a plurality of identifiers for modules that define an authorized modular device 100, and at decision block 806 the payment module engine 302 may determine whether some subset of identifiers retrieved from each of the modules that are connected to the modular device frame 102 match some subset of the plurality of identifiers for modules that define an authorized modular device 100. As such, the identifiers for modules connected to the modular device frame 102 that are retrieved at block 804 may not all need to match all of the identifiers for modules that define an authorized modular device 100 as long as some minimum subset matches, which allows for authentication of the modular device 100 for the payment module 200 even if some of the modules on an authorized modular device 100 are replaced.

If, at decision block 806, it is determined that the modular device is not authenticated for the payment module, the method 800 proceeds to block 808 where a security action is performed. In an embodiment, the payment module 200 may determine at decision block 806 that the modular device 100 to which the payment module 200 was connected at block 802 is not authenticated for the payment module 200 (e.g., its identifying information is not associated with an authenticated modular device in the security information 308b) and, in response may perform a security action at block 808. Security actions may include preventing the transmission of any of the funding source information 308a in the payment modular database 308 for use in conducting a payment transaction, locking the payment module 200 such that further communication through the modular device frame 102 is disabled and/or to prevent a payment transaction from being conducted, erasing the funding source information 308a in the payment module database 308, wiping all information stored on non-transitory, computer-readable mediums in the payment module 200, and/or performing a variety of other security actions known in the art that would prevent any sensitive information on the payment module 200 from being accessed.

If, at decision block 806, it is determined that the modular device is authenticated for the payment module, the transmission of the funding source information 308a from the payment module database 308 is enabled. In an embodiment, the payment module engine 200 may enable, allow, and/or otherwise facilitate the transmission of funding source information 308a from the payment module database 308 in order to conduct a payment transaction, discussed in further detail below. Thus, a user of the payment module 200 may authorize any number of modular devices for use with the payment module 200, and then use the payment module with any of those modular devices while ensuring (via blocks 802-808) that loss or theft of the payment module will not allow its use with a non-authorized modular device.

The method 800 may then proceed to optional decision block 810 and block 814, where it is then determined whether a request to access a virtual currency wallet is received. Optional decision block 810 and block 814 illustrate a situation where the payment module 200 provides a virtual currency wallet manager that regulates access to multiple virtual currency wallets. However, in some embodiments, the payment module 200 may not include the virtual currency wallet manager taught herein, and following a determination at decision block 806 that the modular device 100 is authorized for the payment module 200, the method 800 may proceed directly to block 812. However, when the payment module 200 include the virtual currency wallet manager, a request to access a virtual currency wallet included on the payment module 200 may initiate additional security layers in the payment module 200. However, if at decision block 810 it is determined that no request to access a virtual currency wallet has been received, the method 800 proceeds to block 812 where a payment transaction is conducted.

In an embodiment, at block 812 the payment module engine 302 may receive a request to conduct a payment transaction and, in response, retrieve at least some of the funding source information 308a to conduct the payment transaction. As discussed above, prior to the method 800, the payment module 200 may provide the user to ability to add funding sources to the payment module database 308 that are then stored in the funding source information 308a. For example, the user may add checking funding source(s) to the funding source information 308a (e.g., by providing checking account information needed to conduct a payment transaction using checking (s)account of the user), savings funding source(s) to the funding source information 308a (e.g., by providing savings account information needed to conduct a payment transaction using savings account(s) of the user), credit funding source(s) to the funding source information 308a (e.g., by providing credit account information needed to conduct a payment transaction using credit account(s) of the user), and/or any other funding sources known in the art to the funding source information.

Requests to conduct a payment transaction may be received in a variety of manners, and will typically result in a payment transaction conducted with a merchant through a merchant device, but will sometime result in a payment transaction conducted with another user through their user device. In an embodiment, the payment module 300 may use the wireless communication system 306 to receive a request to conduct a payment transaction. For example, the user of the modular device 100 may bring the modular device 100 and payment module 200 within range of an NFC or other wireless payment system in order provide a request to the payment module 200 to conduct a payment transaction, and the payment module 200 may then communicate with the payment system to transmit funding source information to the payment system in order to conduct the payment transaction (e.g., via the wireless communication system(s) 306 in the payment module 300, using a communication module connected to the modular device frame 102, etc.). In such embodiments, a payment application may be provided for display on the display module 104 to the user to allow the user to select a funding source for conducting the payment transaction, or the payment module 200 may default to a particular funding source.

In another embodiment, the payment module 200 may communicate with another payment module (i.e., on another modular device) to receive a request to conduct a payment transaction. For example, the user of the modular device 100 may bring the modular device 100 within range or into engagement with another modular device (e.g., via a "bump" or other touching of the modular devices) in order provide a request to the payment module 200 to conduct a payment transaction, and the payment module 200 may then communicate with the payment module in the other modular device to transmit funding source information to the payment system in order to conduct the payment transaction. In such embodiments, a payment application may be provided for display on the display module 104 to the user to allow the user to select a funding source for conducting the payment transaction, or the payment module 200 may default to a particular funding source.

In another embodiment, the user may utilize a payment application provided for display on the display module 104 to select a funding source for conducting the payment transaction, and the payment module 200 may provide funding source information for that funding source to the card sub-module 502 for transmission using the information transfer element 504a on the card information provisioning member 504. As such, the user may select one of a plurality of credit cards, checking cards, rewards cards, discount cards, gift cards, or other cards to have information for the selected card provided on the information transfer element 504a such that when the user moves the card information provisioning member 504 through a card reader, the information for the selected card is provided to the card reader for conducting the payment transaction.

While a few examples have been provided, one of skill in the art in possession of the present disclosure will recognize that the payment module 200 may retrieve funding source information 308a from the payment module database 308 and conduct the payment transaction at block 812 using any of a variety of methods known in the art that will fall within the scope of the present disclosure. In addition, other payment activities may be performed by the payment module engine 302 in the payment module 300, including bill splitting (e.g., by touching payment modules on different modular devices, etc.), account information retrieval and review, and/or other payment activities known in the art.

If, at decision block 810, a request to access a virtual currency wallet is received, the method 800 then proceeds to block 814 where a plurality of security layers are authenticated. Referring now to FIGS. 9a, 9b, 9c, 9d, and 9e, an example of receiving a request to access a virtual currency wallet and, in response, authenticating a plurality of security layers is illustrated and described. However, a variety of manners for receiving requests to access virtual currency wallets and authenticate security layers other than those illustrated are envisioned as falling within the scope of the present disclosure.

Figure 9A:
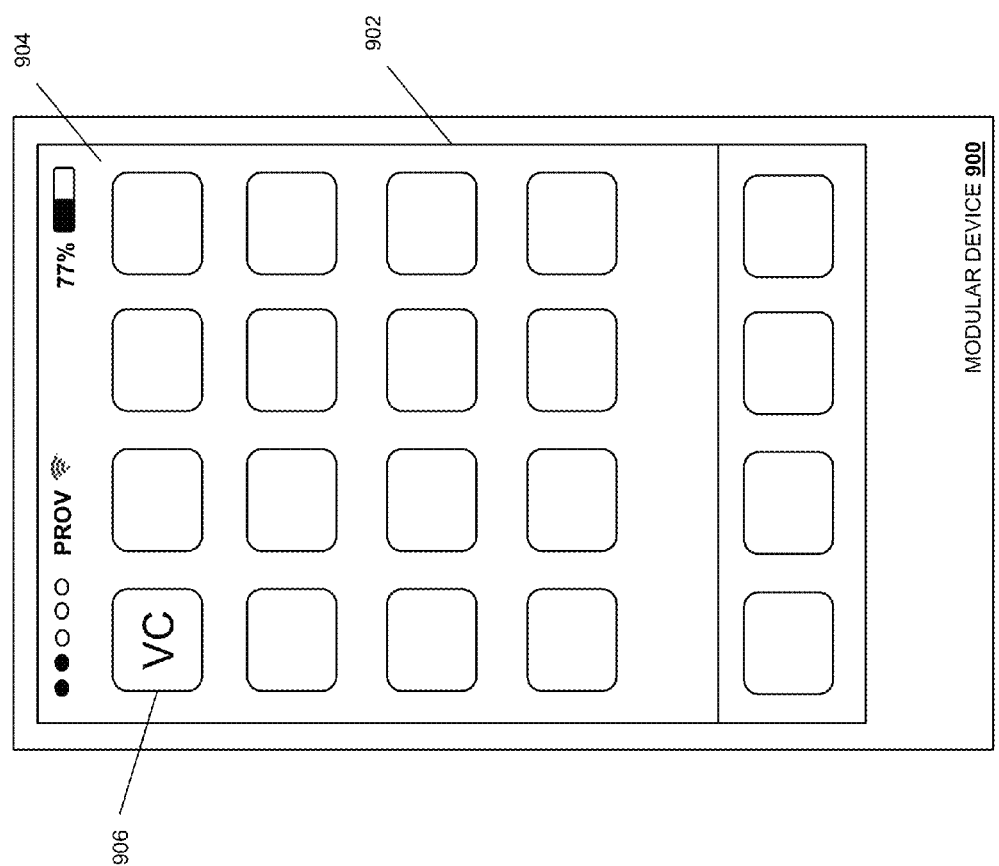
FIG. 9a is a screen shot illustrating a virtual currency wallet management application icon provided on a modular device home screen.

Referring now to FIG. 9a, a modular device 900 is illustrated that may be the modular device 100 discussed above with reference to FIG. 1. However, in some embodiments, the functionality described as performed by the payment module engine 302 in the payment module 200 coupled to the modular device 900 may instead be performed by a payment engine located in an integrated user device such as a non-modular phone or other user device. The modular device 900 includes a display module 902 that may be, for example, the display module 104 discussed above. In the illustrated embodiment, the display module 902 is displaying a home screen 904 that includes a plurality of application icons including a virtual currency wallet management application icon 906. In embodiment, the user of the modular device 900 may select the virtual currency wallet management application icon 906 and, at decision block 810, the payment module engine 302 will detect a request to access a virtual currency wallet. In other embodiments, rather than having a virtual currency wallet manager, the home screen 904 may instead include virtual currency wallet application icons that, when selected by the user, cause the payment module engine 302 to detect a request to access a virtual currency wallet at decision block 810.

Figure 9B:
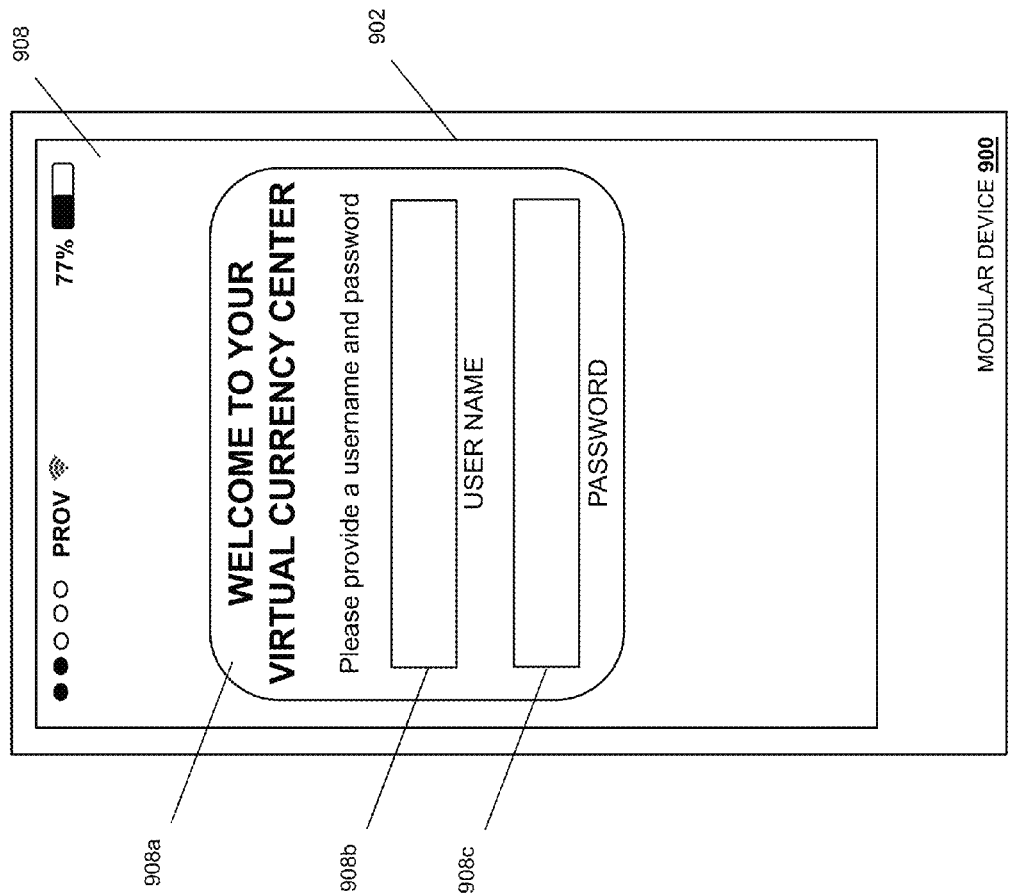
FIG. 9b is a screen shot illustrating a virtual currency center wallet management application providing a first security layer.

Referring now to FIG. 9b and with reference to FIG. 7, the modular device 900 is illustrated with the display module 902 displaying a first security layer screen 908 that may be provided by the virtual machine 700 and the payment module engine 302 at block 814 of the method 800. For example, in response to the user selecting the virtual currency wallet management application icon 906 (or a virtual currency wallet application icon), the payment module engine 302 may communicate with the virtual machine 704 to access the virtual currency wallets included in the virtual cards 706, 708, and 710 accessible by the virtual machine 704, and the virtual machine 704 may present a first security layer using the first security layer screen 908. The first security layer screen 908 includes a first authentication request section 908a that provides a user identifier input 908b and a password input 908c, and that requests that the user provide a username and password to access the virtual currency wallets. In order to access the virtual currency wallets, the user must provide the correct username and password to pass the first security layer presented by the virtual machine 704, and the payment module engine 302 and/or the virtual machine 704 may receive any username and password provided in the user identifier input 908b and a password input 908c, compare it to the security information 308b in the payment module database 308, and authenticate the user for the first security layer in response to determining that a provided username and password are associated with a user that is authorized to access the virtual currency wallets. While a username and password are illustrated as necessary for authenticating at the first security layer, any authentication technique is envisioned as falling within the scope of the present disclosure.

Referring now to FIG. 9c, in response to determining that a provided username and password are associated with a user that is authorized to access the virtual currency wallets, the display module 902 on the modular device 900 may display a virtual currency wallet application icon screen 910 that includes a plurality of virtual currency wallet application icons 910a, 910b, and 910c. In the illustrated embodiment, the virtual currency wallet application icons 910a, 910b, and 910c are associated with different virtual currency wallets holding different types of virtual currency (e.g., a Bitcoin wallet, a Litecoin wallet, and a Dogecoin wallet). However, any number of virtual currency wallets may be included in the virtual machine 702, and may be hold different types of virtual currency or the same types of virtual currency (e.g., there may be multiple virtual currency application icons on the virtual currency wallet application icon screen 910 that hold Bitcoins). In response to being presented the virtual currency wallet application icon screen 910, the user may select the virtual currency wallet application icon for the virtual currency wallet that the user wishes to access in order to, for example, conduct a payment transaction.

Figure 9D:
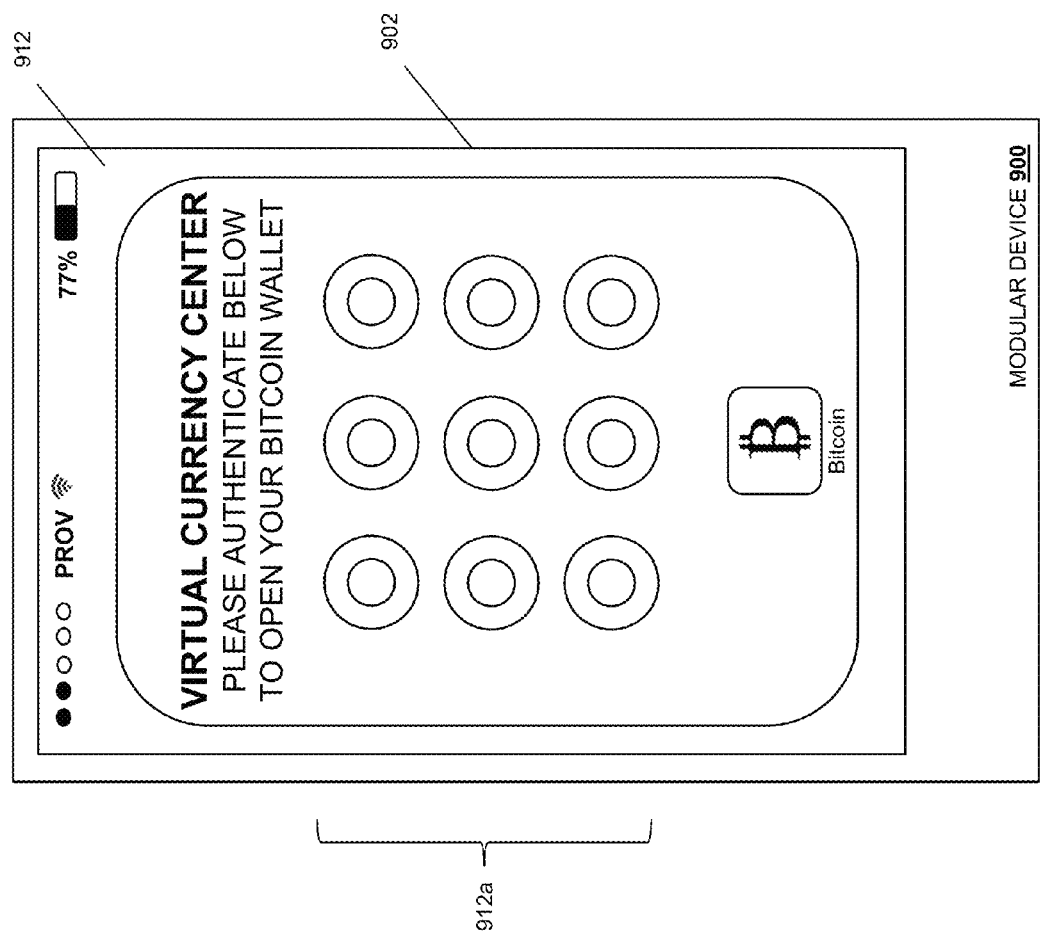
FIG. 9d is a screen shot illustrating a virtual currency center wallet management application providing a second security layer.

Referring now to FIG. 9d, and with reference to FIG. 7, the modular device 900 is illustrated with the display module 902 displaying a second security layer screen 912 that may be provided by one of the virtual cards 706, 708, or 710 and the payment module engine 302 at block 814 of the method 800. For example, in response to the user selecting the virtual currency wallet application icon 910a (i.e., the Bitcoin wallet in FIG. 9c), the payment module engine 302 may communicate with the virtual card 706 (e.g., via the virtual machine 704) to access the first virtual currency wallet 706a included in the virtual card 706, and the virtual card 706 may present a second security layer using the second security layer screen 912. The second security layer screen 912 includes a second authentication request section 912a that provides a plurality of pattern elements, and that requests that the user use the pattern elements in order to access the first virtual currency wallet 706a. In order to access the first virtual currency wallet 706a, the user must draw a pattern by connecting the pattern elements to pass the second security layer presented by the virtual card 706, and the payment module engine 302 and/or the virtual card 706 may receive any pattern provided using the pattern elements, compare it to the security information 308b in the payment module database 308, and authenticate the user for the second security layer in response to determining that a provided pattern associated with a user that is authorized to access the first virtual currency wallet 706a. While a pattern using pattern elements is illustrated as necessary for authenticating at the second security layer, any authentication technique is envisioned as falling within the scope of the present disclosure.

Figure 9E:
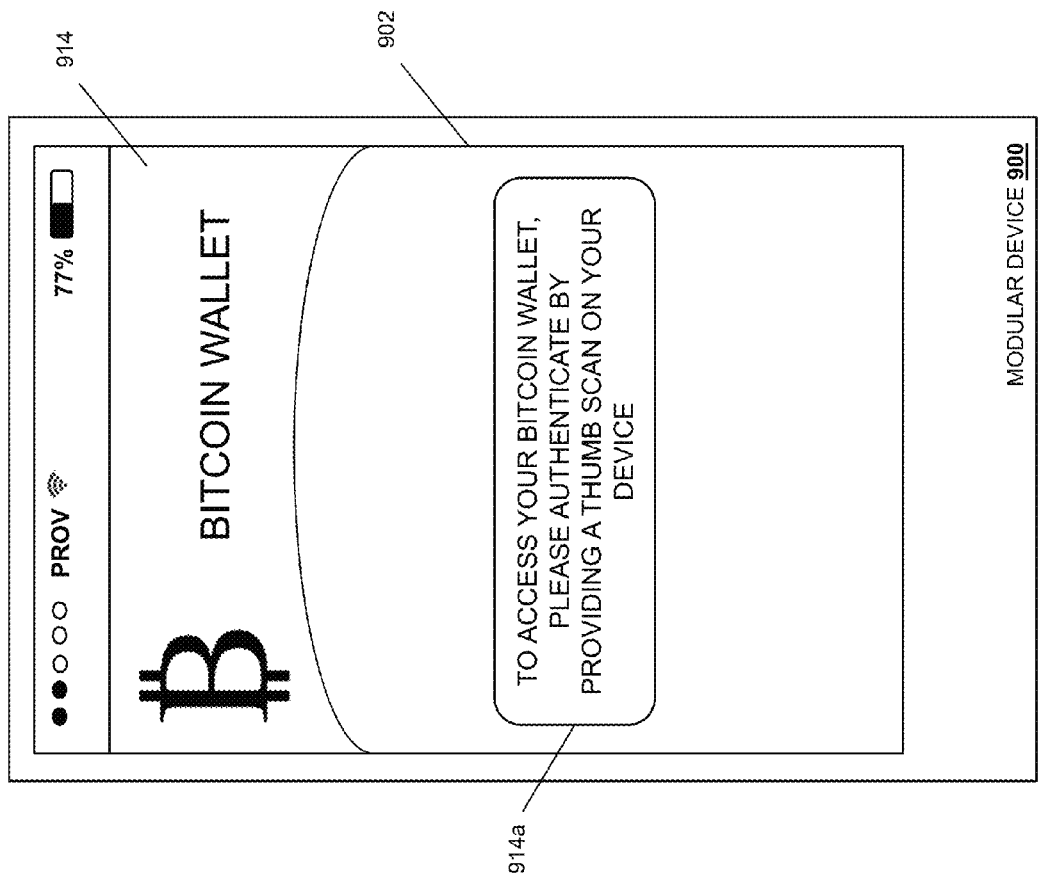
FIG. 9e is a screen shot illustrating a virtual currency wallet application providing a third security layer.

Referring now to FIG. 9e, in response to determining that a provided pattern is associated with a user that is authorized to access the first virtual currency wallet 706a, the display module 902 on the modular device 900 may display a third security layer screen 914 that may be provided by the first virtual wallet application 706a and the payment module engine 302 at block 814 of the method 800. For example, in response to the user providing an authenticated pattern, the payment module engine 302 may communicate with the first virtual wallet application 706a (e.g., via the virtual machine 704 and the virtual card 706) to access the first virtual currency wallet 706a included in the virtual card 706, and the first virtual currency wallet 706a may present a third security layer that includes a third authentication request section 914a that provides a request that the user provide a biometric input in order to access the first virtual currency wallet 706a. In order to access the first virtual currency wallet 706a, the user must provide a biometric input to a biometric input system (e.g., a thumb scan on the biometric input system 402 discussed above) to pass the third security layer presented by the first virtual currency wallet 706a, and the payment module engine 302 and/or the first virtual currency wallet 706a may receive the biometric input provided, compare it to the security information 308b in the payment module database 308, and authenticate the user for the third security layer in response to determining that a biometric input is associated with a user that is authorized to access the first virtual currency wallet 706a. While a biometric input is illustrated as necessary for authenticating at the third security layer, any authentication technique is envisioned as falling within the scope of the present disclosure.

Following being authenticated to pass the third security layer, the method 800 may proceed to block 812, discussed in detail above. However, in addition to being able to conduct conventional payment transactions as discussed above, the user may now also be able to conduct payment transaction using the first virtual currency wallet 706a by, for example, transferring virtual currency to another user by designating a public address of that user, designating a virtual currency amount, and providing a private key for the first virtual currency wallet 706a such that the first virtual currency wallet may transfer the designated amount of virtual currency to the public address associated with the other user. As discussed above, while specific security layers including usernames and passwords, pattern provisioning, and biometric inputs have been illustrated and described, any of authentication techniques may be utilized in authenticating the plurality of authentication levels at block 814. It has been found that the three (or more) security layers provide practically insurmountable security for the virtual currency wallets stored on the payment module 200.

Thus, systems and methods for conducting payment transactions using a modular device payment module have been described that provide a payment module that may be connected to a modular device, and that operates to ensure that the modular device is authorized for use with the payment module prior to enabling payment transactions with funding sources available to the payment module. In the event the modular device is not authorized for use with a payment module to which it is connected, the payment module may perform security operations that include disabling the access to or transmission of funding source information, locking access to the payment module, and even erasing the funding source information (or all the information) from the payment module. Furthermore, systems and methods for managing multiple virtual currency wallets have been described that manage multiple virtual currency wallets that may hold different types of virtual currency, while providing multiple security layers that require authenticated credentials in order to access to any of the virtual currency wallets.

Figure 10:
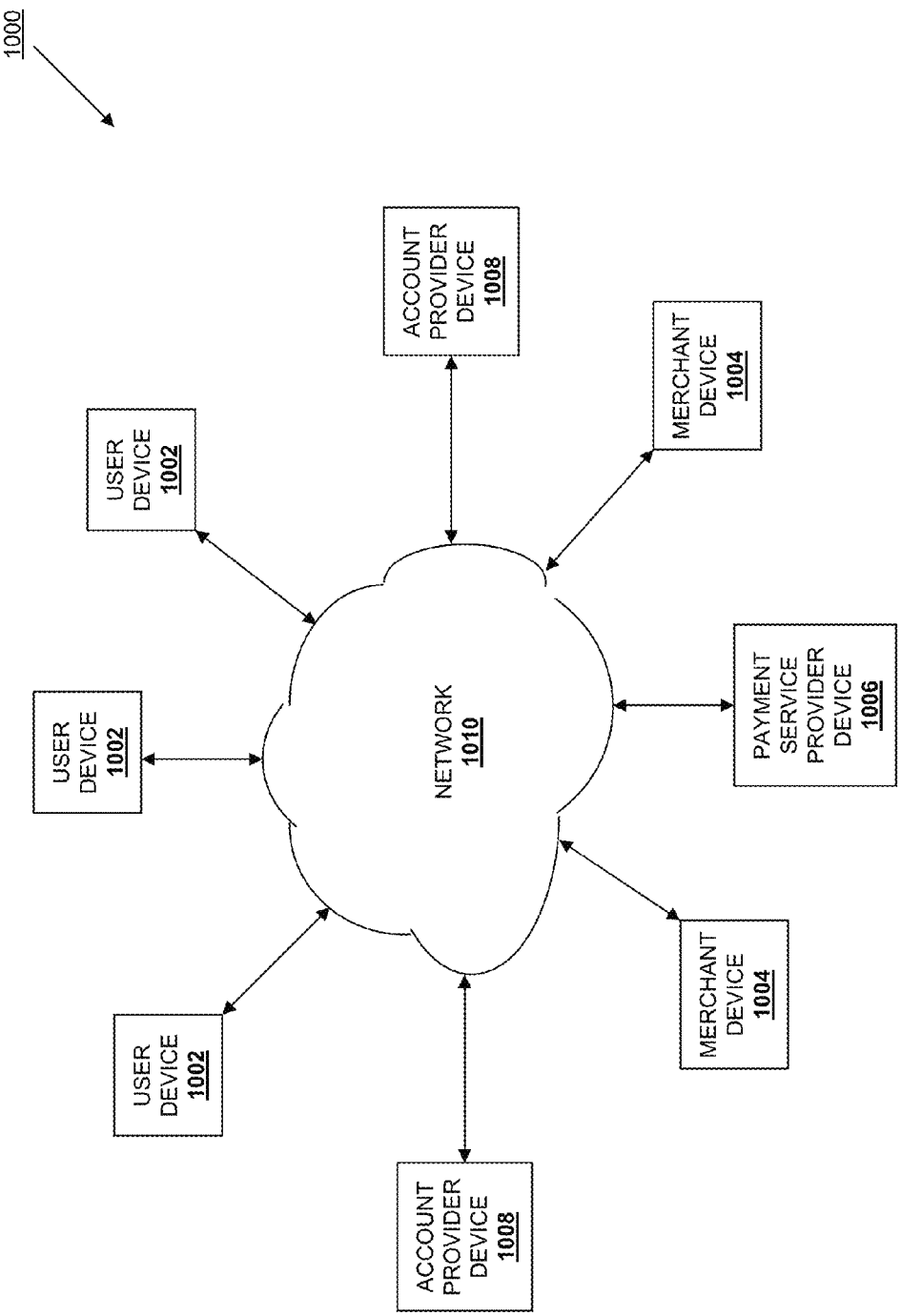
FIG. 10 is a schematic view illustrating an embodiment of a networked system.

Referring now to FIG. 10, an embodiment of a network-based system 1000 for implementing one or more processes described herein is illustrated. As shown, network-based system 1000 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 10 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1000 illustrated in FIG. 10 includes a plurality of user devices 1002, a plurality of merchant devices 1004, a payment service provider device 1006, and a plurality of account holder devices 1008 in communication over a network 1010. Any of the user devices 1002 may be the modular devices 200, discussed above. The merchant devices 1004 may be the merchant devices discussed above and may be operated by the merchant discussed above. The payment service provider device 1006 may be the payment service provider devices discussed above and may be operated by a payment service provider such as, for example, PayPal Inc. of San Jose, Calif. The account provider devices 1008 may be the account provider devices discussed above and may be operated by the account providers discussed above such as, for example, credit card account providers, bank account providers, savings account providers, and a variety of other account providers known in the art.

The user devices 1002, merchant devices 1004, payment service provider device 1006, and account provider devices 1008 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1000, and/or accessible over the network 1010.

The network 1010 may be implemented as a single network or a combination of multiple networks. For example, in various embodiments, the network 1010 may include the Internet and/or one or more intranets, landline networks, wireless networks, and/or other appropriate types of networks.

The user device 1002 may be implemented using any appropriate combination of hardware and/or software configured for wired and/or wireless communication over network 1010. For example, in one embodiment, the user device 1002 may be implemented as a personal computer of a user in communication with the Internet. In other embodiments, the user device 1002 may be a smart phone, personal digital assistant (PDA), laptop computer, and/or other types of computing devices.

The user device 1002 may include one or more browser applications which may be used, for example, to provide a convenient interface to permit the user to browse information available over the network 1010. For example, in one embodiment, the browser application may be implemented as a web browser configured to view information available over the Internet.

The user device 1002 may also include one or more toolbar applications which may be used, for example, to provide user-side processing for performing desired tasks in response to operations selected by the user. In one embodiment, the toolbar application may display a user interface in connection with the browser application.

The user device 1002 may further include other applications as may be desired in particular embodiments to provide desired features to the user device 1002. In particular, the other applications may include a payment application for payments assisted by a payment service provider through the payment service provider device 1006. The other applications may also include security applications for implementing user-side security features, programmatic user applications for interfacing with appropriate application programming interfaces (APIs) over the network 1010, or other types of applications. Email and/or text applications may also be included, which allow the user to send and receive emails and/or text messages through the network 1010. The user device 1002 includes one or more user and/or device identifiers which may be implemented, for example, as operating system registry entries, cookies associated with the browser application, identifiers associated with hardware of the user device 1002, or other appropriate identifiers, such as a phone number. In one embodiment, the user identifier may be used by the payment service provider device 1006 and/or account provider device 1008 to associate the user with a particular account as further described herein.

The merchant device 1004 may be maintained, for example, by a conventional or on-line merchant, conventional or digital goods seller, individual seller, and/or application developer offering various products and/or services in exchange for payment to be received conventionally or over the network 1010. In this regard, the merchant device 1004 may include a database identifying available products and/or services (e.g., collectively referred to as items) which may be made available for viewing and purchase by the user.

The merchant device 1004 also includes a checkout application which may be configured to facilitate the purchase by the payer of items. The checkout application may be configured to accept payment information from the user through the user device 1002, the account provider through the account provider device 1008, and/or from the payment service provider through the payment service provider device 1006 over the network 1010.

Figure 11:
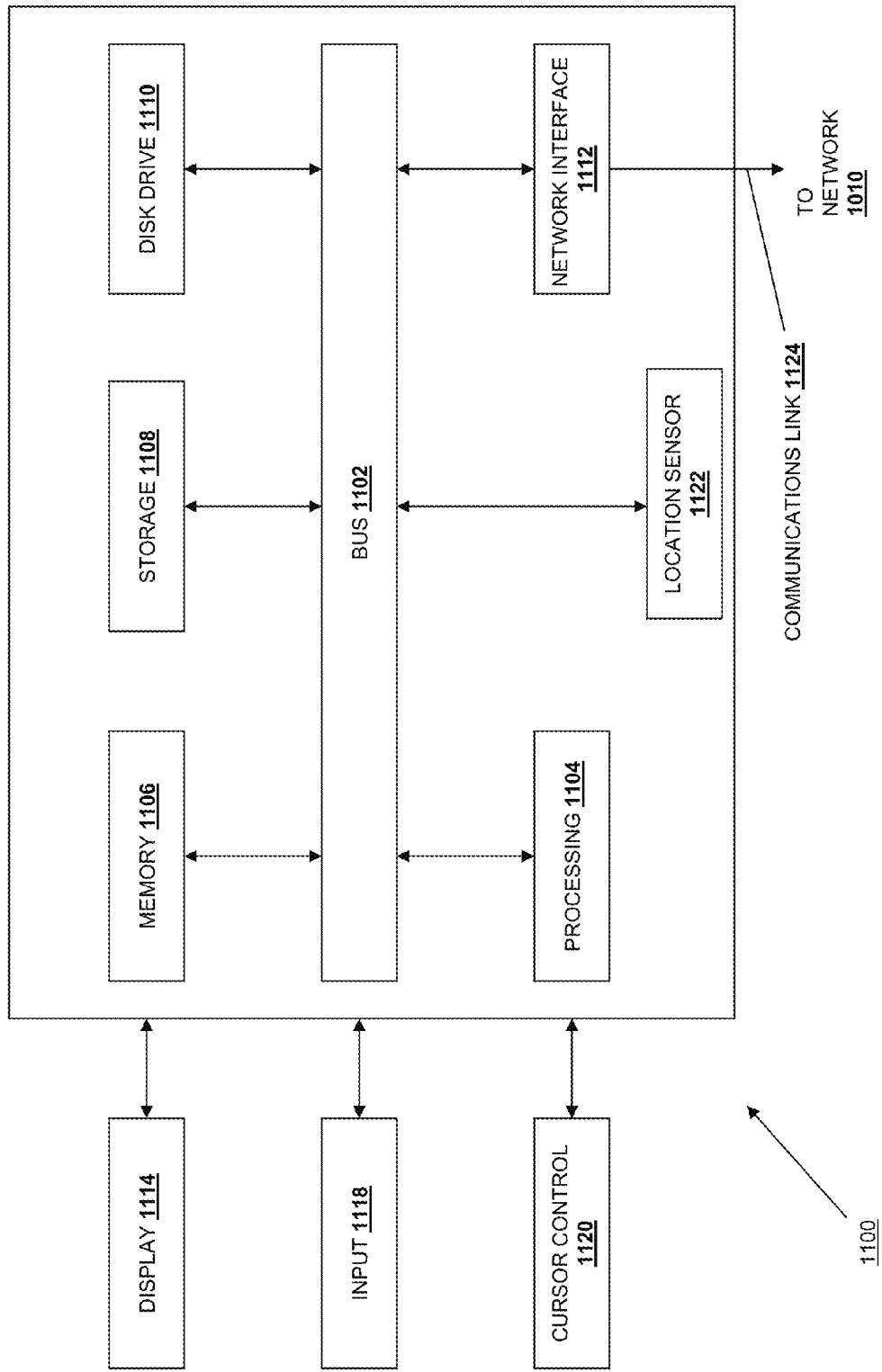
FIG. 11 is a schematic view illustrating an embodiment of a computer system.

Referring now to FIG. 11, an embodiment of a computer system 1100 suitable for implementing, for example, the user device 1002, the merchant device 1004, the payment service provider device 1006, and/or the account provider device 1008, is illustrated. It should be appreciated that other devices utilized by users, merchants, payment service providers, and account providers in the payment system discussed above may be implemented as the computer system 1100 in a manner as follows.

In accordance with various embodiments of the present disclosure, computer system 1100, such as a computer and/or a network server, includes a bus 1102 or other communication mechanism for communicating information, which interconnects subsystems and components, such as a processing component 1104 (e.g., processor, micro-controller, digital signal processor (DSP), etc.), a system memory component 1106 (e.g., RAM), a static storage component 1108 (e.g., ROM), a disk drive component 1110 (e.g., magnetic or optical), a network interface component 1112 (e.g., modem or Ethernet card), a display component 1114 (e.g., CRT or LCD), an input component 1118 (e.g., keyboard, keypad, or virtual keyboard), a cursor control component 1120 (e.g., mouse, pointer, or trackball), and/or a location determination component 1122 (e.g., a Global Positioning System (GPS) device as illustrated, a cell tower triangulation device, and/or a variety of other location determination devices known in the art.) In one implementation, the disk drive component 1110 may comprise a database having one or more disk drive components.

In accordance with embodiments of the present disclosure, the computer system 1100 performs specific operations by the processor 1104 executing one or more sequences of instructions contained in the memory component 1106, such as described herein with respect to the user device 1002, the merchant device 1004, the payment service provider device 1006, and/or the account provider device 1008. Such instructions may be read into the system memory component 1106 from another computer readable medium, such as the static storage component 1108 or the disk drive component 1110. In other embodiments, hard-wired circuitry may be used in place of or in combination with software instructions to implement the present disclosure.

Logic may be encoded in a computer readable medium, which may refer to any medium that participates in providing instructions to the processor 1104 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1110, volatile media includes dynamic memory, such as the system memory component 1106, and transmission media includes coaxial cables, copper wire, and fiber optics, including wires that comprise the bus 1102. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1100. In various other embodiments of the present disclosure, a plurality of the computer systems 1100 coupled by a communication link 1124 to the network 1010 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1100 may transmit and receive messages, data, information and instructions, including one or more programs (i.e., application code) through the communication link 1124 and the network interface component 1112. The network interface component 1112 may include an antenna, either separate or integrated, to enable transmission and reception via the communication link 1124. Received program code may be executed by processor 1104 as received and/or stored in disk drive component 1110 or some other non-volatile storage component for execution.

Figure 12:
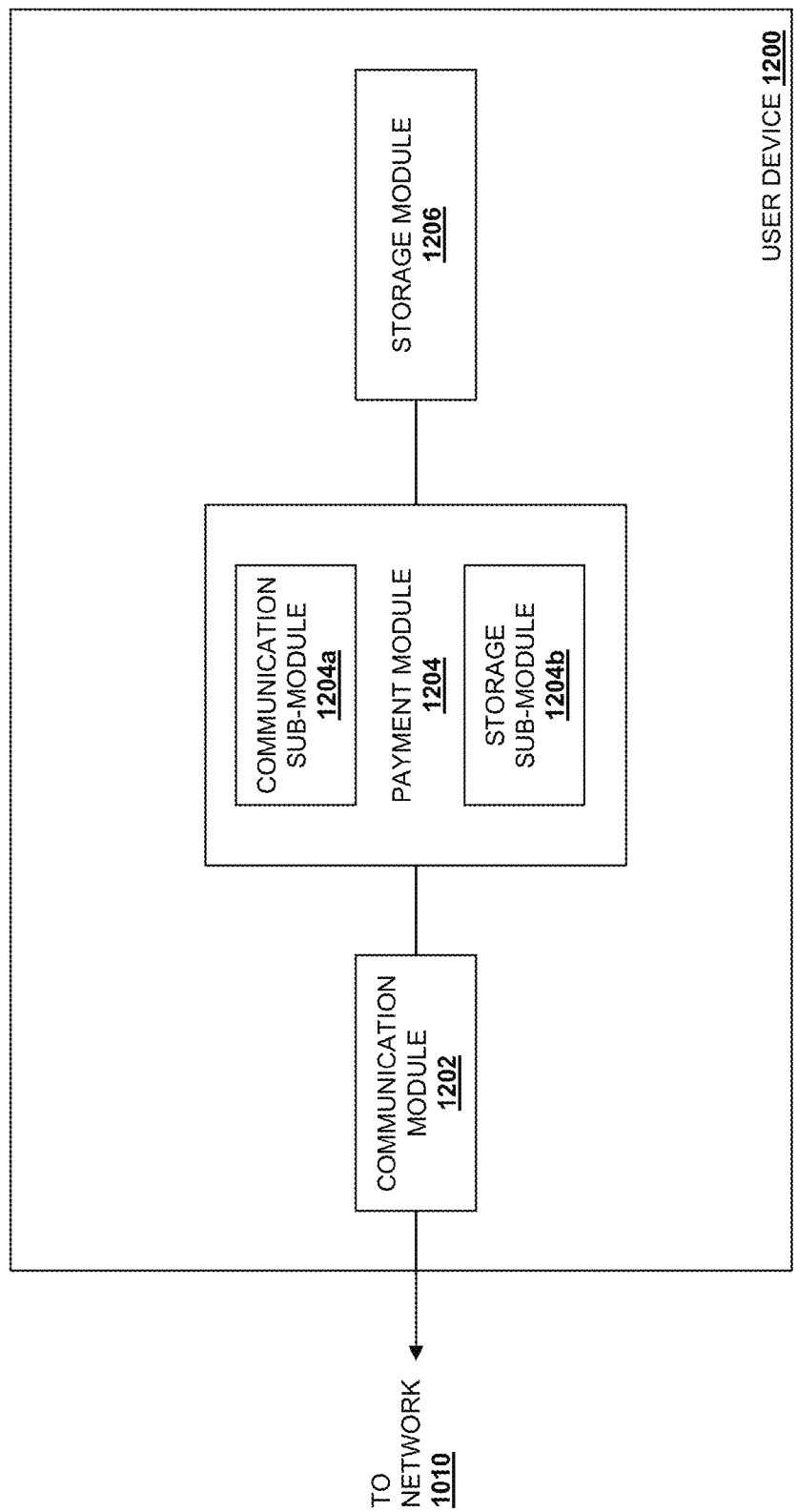
FIG. 12 is a schematic view illustrating an embodiment of a user device.

Referring now to FIG. 12, an embodiment of a user device 1200 is illustrated. In an embodiment, the device 1200 may be the user devices, modular devices, and/or merchant devices discussed above. The device 1200 includes a communication module 1202 that is coupled to the network 1010 and to any or all of a payment module 1204, a storage module 1206, and/or any of the other modules discussed above. In addition, the payment module 1204 includes a communication sub-module 1204a and a storage sub-module 1204b and/or any of the other payment module sub-modules discussed above. Any or all of the modules 1202-1206 and sub-modules 1204a-1204b may be implemented as a subsystem of the user device including for example, a circuit, a hardware component, a hardware subcomponent, and/or a variety of other subsystems known in the art. Furthermore, any or all of the modules 1202-1206 and sub-modules 1204a-1204b may be preconfigured to perform their disclosed functionality, or may be configured by a processing system "on-the-fly" or as needed to perform their disclosed functionality. As such, any or all of the modules 1202-1206 and sub-modules 1204a-1204b may include preconfigured and dedicated circuits and/or hardware components of the user device 1200, or may be circuits and/or hardware components that are configured as needed.

For example, any or all of the modules 1202-1206 and sub-modules 1204a-1204b may be provided via one or more circuits that include resistors, inductors, capacitors, voltage sources, current sources, switches, logic gates, registers, and/or a variety of other circuit elements known in the art. One or more of the circuit elements in a circuit may be configured to provide the circuit(s) that cause the modules 1202-1206 and sub-modules 1204a-1204b to perform the functions described above. As such, in some embodiments, preconfigured and dedicated circuits may be implemented to perform the functions of the modules 1202-1206 and sub-modules 1204a-1204b. In other embodiments, a processing system may execute instructions on a non-transitory, computer-readable medium to configure one or more circuits as needed to perform the functions of the modules 1202-1206 and sub-modules 1204a-1204b.

The communication module 1202 may be included as a separate module provided in the device 1200, or may be provided using instructions stored on a computer-readable medium that, when executed by a processing system in the device 1200, configure the communication module 1202 to send and receive information over the network 1010, as well as provide any of the other functionality that is discussed above. The storage module 1206 may be included as a separate module provided in the device 1200, or may be provided using instructions stored on a computer-readable medium that, when executed by a processing system in the device 1200, configure the storage module 1206 to store security information and/or any of the other information discussed above as being stored on the modular device.

The payment module 1204 may be included as a separate module provided in the device 1200, or may be provided using instructions stored on a computer-readable medium that, when executed by a processing system in the device 1200, configure the payment module 1204 to detect connection to a modular device, retrieve identifying information from a modular device, determine whether a identifying information for a modular device is associated with an authorized modular device in the storage sub-module 1204b, conduct payment transaction using the communication sub-module 1204a, and/or perform any of the other functionality of the payment modules discussed above. Furthermore, other modules discussed above but not illustrated in FIG. 12 may be provided as separate modules on the device 1200, or using instructions stored on a computer-readable medium similarly as discussed above. While the storage system 1206 has been illustrated as located in the device 1200, one of skill in the art will recognize that it may include multiple storage devices and may be connected to the modules 1202-1206 and sub-modules 1204a-1204b through the network 1010 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and users; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A modular device payment module, comprising:
a chassis;
at least one modular device connector located on the chassis;
a payment module database storing funding source information and security information;
a plurality of cards that each include a virtual currency wallet;
a virtual machine that is configured to provide access to the virtual currency wallet of each of the plurality of cards;
a hardware processing system coupled to the at least one modular device connector, the payment module database, and the virtual machine; and
a non-transitory memory system that includes instructions that, when executed by the hardware processing system, provide a payment module engine that is configured to:
determine that the at least one modular device connector has been connected to a modular device frame of a modular device;
retrieve modular device identifying information from the modular device; and
determine that the modular device identifying information matches an authorized modular device identified by the security information in the payment module database;
receive a request to access a first virtual currency wallet provided on a first card of the plurality of cards, wherein in response to the request to access the first virtual currency wallet provided on the first card, the virtual machine presents a first security layer, the first card presents a second security layer in response to an authentication of the first security layer, and the first virtual currency wallet presents a third security layer in response to an authentication of the second security layer;
enable the transmission of at least some of the funding source information from the payment module database to conduct a payment transaction in response to the modular device identifying information matching the authorized modular device identified by the security information in the payment module database; and
enable the transmission of virtual currency from the first virtual currency wallet in response to the authentication of the first security layer, the second security layer, and the third security layer.

2. The modular device payment module of claim 1, further comprising:
a biometric input system located on the chassis and coupled to the hardware processing system, wherein the payment module engine is configured to receive a biometric input from the biometric input system and determine whether the biometric input matches an authorized biometric input identified by the security information in the payment module database.

3. The modular device payment module of claim 1, further comprising:
a card information provisioning member extending from the chassis, wherein the card information provisioning member is configured to provide card information to a card reader.

4. The modular device payment module of claim 1, further comprising:
a wireless communication system coupled to the hardware processing system, wherein the payment module engine is configured to conduct the payment transaction using the wireless communication system.

5. The modular device payment module of claim 1, wherein the virtual currency wallets included on at least two of the plurality of cards are associated with the same type of virtual currency.

6. The modular payment device of claim 1, wherein at least one of the plurality of cards are virtual cards.

7. A method for conducting a payment transaction with a modular device payment module, comprising:
receiving, by a payment module, a virtual currency wallet on each of a plurality of cards;
coupling, by the payment module, a virtual machine to each of the plurality of cards;
determining, by the payment module, that at least one modular phone connector on the payment module has been connected to a first modular phone;
retrieving, by the payment module from the first modular phone, first modular phone identifying information;

determining, by the payment module, that the first modular phone identifying information matches an authorized modular phone stored in a database;
receiving, by the payment module from the first modular phone, a request to access a first virtual currency wallet provided on a first card of the plurality of cards and, in response:
  presenting, by the virtual machine in the payment module, a first security layer;
  presenting, by a first card of the plurality of cards in the payment module, a second security layer in response to an authentication of the first security layer; and
  presenting, by a first virtual currency wallet in the first card, a third security layer in response to an authentication of the second security layer;
enabling, by the payment module, the transmission of funding source information in the database to conduct a payment transaction in response to the first modular phone identifying information matching the authorized modular phone stored in the database; and
enabling, by the payment module, the transmission of virtual currency from the first virtual currency wallet in response to the authentication of the first security layer, the second security layer, and the third security layer.

8. The method of claim 7, further comprising:
receiving, by the payment module from a biometric input system that is coupled to the payment module, a biometric input; and
determining, by the payment module, whether the biometric input matches an authorized biometric input in the database.

9. The method of claim 8, further comprising:
transmitting card information to a card reader in response to moving a card information provisioning member that extends from the payment module through the card reader.

10. The method of claim 7, wherein the payment module is funding source specific such that the funding source information is associated with a single funding source.

11. The method of claim 7, wherein the virtual currency wallets included on at least two of the plurality of cards are associated with the same type of virtual currency.

12. The method of claim 11, wherein at least one of the plurality of cards are virtual cards.

13. The method of claim 7, further comprising:
determining, by the payment module, that the at least one modular phone connector on the payment module has been connected to a second modular phone;
retrieving, by the payment module from the second modular phone, second modular phone identifying information;
determining, by the payment module, that the second modular phone identifying information does not match an authorized modular phone stored in a database and, in response, preventing the transmission of the funding source information in the database to conduct a payment transaction.

14. A non-transitory computer-readable medium having stored thereon machine-readable instructions executable to cause a machine to perform operations comprising:
  configuring each of a plurality of cards to store a virtual currency wallet;
  configuring a virtual machine to manage each to the plurality of cards;
  configuring a module to access the virtual currency wallet on any of the plurality of cards through the virtual machine;
  configuring the module to determine that at least one modular system connector on the module has been connected to a first modular system;
  configuring the module to retrieve first modular system identifying information from the first modular system;
  configuring the module to determine that the first modular system identifying information matches an authorized modular system stored in a database;
  configuring the module to receive a request to access a first virtual currency wallet provided on a first card of the plurality of cards, wherein in response to the request to access the first virtual currency wallet provided on the first card, the virtual machine presents a first security layer, the first card presents a second security layer in response to an authentication of the first security layer, and the first virtual currency wallet presents a third security layer in response to an authentication of the second security layer;
  configuring the module to enable the transmission of funding source information in the database to conduct a payment transaction in response to the first modular system identifying information matching the authorized modular system stored in the database; and
  configuring the module to enable the transmission of virtual currency from the first virtual currency wallet in response to the authentication of the first security layer, the second security layer, and the third security layer.

15. The non-transitory machine-readable medium of claim 14, wherein the operations further comprise:
  configuring the module to receive a biometric input from a biometric input system that is included on the module; and
  configuring the module to determine whether the biometric input matches an authorized biometric input in the database.

16. The non-transitory machine-readable medium of claim 15, wherein the operations further comprise:
  configuring the module to provide card information to a card reader using a card information provisioning member that extends from the module.

17. The non-transitory machine-readable medium of claim 14, wherein the operations further comprise:
  configuring the module to transmit the funding source information wirelessly.

18. The non-transitory machine-readable medium of claim 14, wherein the virtual currency wallets included on at least two of the plurality of cards are associated with the same type of virtual currency.

19. The non-transitory machine-readable medium of claim 14, wherein at least one of the plurality of cards are virtual cards.

20. The non-transitory machine-readable medium of claim 14, wherein the operations further comprise:
  configuring the module to determine that the at least one modular system connector on the module has been connected to a second modular system;
  configuring the module to retrieve second modular system identifying information from the second modular system;
  configuring the module to determine that the second modular system identifying information matches an authorized modular system stored in the database and, in response, lock the module to prevent a payment transaction from being conducted.

* * * * *